US012585291B2

(12) United States Patent
Toyoshi et al.

(10) Patent No.: US 12,585,291 B2
(45) Date of Patent: Mar. 24, 2026

(54) INFORMATION PROCESSING METHOD, PROCESSING APPARATUS, AND INFORMATION PROCESSING SYSTEM, AND PROGRAM

(71) Applicant: Sony Group Corporation, Tokyo (JP)

(72) Inventors: Masahiko Toyoshi, Tokyo (JP); Kohei Urushido, Tokyo (JP); Shinichiro Abe, Tokyo (JP); Takuto Motoyama, Tokyo (JP); Masaki Handa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 234 days.

(21) Appl. No.: 18/546,597

(22) PCT Filed: Jan. 20, 2022

(86) PCT No.: PCT/JP2022/001991
§ 371 (c)(1),
(2) Date: Aug. 16, 2023

(87) PCT Pub. No.: WO2022/181130
PCT Pub. Date: Sep. 1, 2022

(65) Prior Publication Data
US 2024/0142995 A1 May 2, 2024

(30) Foreign Application Priority Data

Feb. 26, 2021 (JP) ................................. 2021-030399

(51) Int. Cl.
G05D 1/667 (2024.01)
B64D 45/08 (2006.01)
(Continued)

(52) U.S. Cl.
CPC ............ G05D 1/667 (2024.01); B64D 45/08 (2013.01); B64U 70/00 (2023.01); G05D 1/222 (2024.01);
(Continued)

(58) Field of Classification Search
None
See application file for complete search history.

(56) References Cited

U.S. PATENT DOCUMENTS

2017/0045894 A1 2/2017 Canoy et al.

FOREIGN PATENT DOCUMENTS

CN 118506102 A * 8/2024 ............. G06V 10/82
JP 2018-506475 A 3/2018
(Continued)

OTHER PUBLICATIONS

Stefanie Tellex, Thomas Kollar, Steven Dickerson, Matthew R. Walter, Ashis Gopal Banerjee, Seth Teller, and Nicholas Roy. Understanding natural language commands for robotic navigation and mobile manipulation. In AAAI Conference on Artificial Intelligence, 2011. (Year: 2011).*

(Continued)

*Primary Examiner* — Peter D Nolan
*Assistant Examiner* — Michael F Whalen
(74) *Attorney, Agent, or Firm* — XSENSUS LLP

(57) ABSTRACT

A configuration is described that is capable of determining a target landing position of a drone according to a sentence indicating a landing position generated by a user. Aspects including identifying an object type of an object contained in a captured image of a camera mounted on a mobile body; sentence analysis processing analyzes a sentence indicating a designated arrival position; word-corresponding subject selection processing collates results of the sentence analysis processing with the object identification processing and selecting a subject corresponding to a word included in the sentence indicating the designated arrival position from the captured image; and target arrival position determination processing extracts an area corresponding to the designated arrival position indicated by the sentence indicating the
(Continued)

designated arrival position from the captured image on the basis of a result of word-corresponding subject selection processing, and area determination is made as target arrival position of mobile body.

18 Claims, 33 Drawing Sheets

(51) Int. Cl.

| | |
|---|---|
| *B64U 70/00* | (2023.01) |
| *G05D 1/222* | (2024.01) |
| *G05D 1/243* | (2024.01) |
| *G05D 1/654* | (2024.01) |
| *G06V 20/70* | (2022.01) |
| *B64U 10/14* | (2023.01) |
| *B64U 101/00* | (2023.01) |
| *B64U 101/30* | (2023.01) |
| *B64U 101/64* | (2023.01) |
| *G05D 1/244* | (2024.01) |
| *G05D 105/28* | (2024.01) |
| *G05D 109/25* | (2024.01) |
| *G06V 10/25* | (2022.01) |

(52) U.S. Cl.
CPC ............. *G05D 1/243* (2024.01); *G05D 1/654* (2024.01); *G06V 20/70* (2022.01); *B64U 10/14* (2023.01); *B64U 2101/00* (2023.01); *B64U 2101/30* (2023.01); *B64U 2101/64* (2023.01); *G05D 1/244* (2024.01); *G05D 2105/285* (2024.01); *G05D 2109/254* (2024.01); *G06V 10/25* (2022.01)

(56) References Cited

FOREIGN PATENT DOCUMENTS

| | | |
|---|---|---|
| JP | 2020-057225 A | 4/2020 |
| JP | 2020-108981 A | 7/2020 |
| JP | 2020-138618 A | 9/2020 |
| JP | 2020-138681 A | 9/2020 |
| KR | 10-2019-0057824 A | 5/2019 |
| KR | 10-2167745 B1 | 10/2020 |

OTHER PUBLICATIONS

Siddharth Karamcheti, Edward C. Williams, Dilip Arumugam, Mina Rhee, Nakul Gopalan, Lawson L.S. Wong, and Stefanie Tellex. A tale of two DRAGGNs: A hybrid approach for interpreting action-oriented and goal-oriented instructions. (Year: 2017).*
B. Huang, D. Bayazit, D. Ullman, N. Gopalan and S. Tellex, "Flight, Camera, Action! Using Natural Language and Mixed Reality to Control a Drone," 2019 International Conference on Robotics and Automation (ICRA), Montreal, QC, Canada, 2019, pp. 6949-6956, doi: 10.1109/ICRA.2019.8794200. (Year: 2019).*
International Search Report and Written Opinion mailed on Mar. 1, 2022, received for PCT Application PCT/JP2022/001991, filed on Jan. 20, 2022, 8 pages including English Translation.

\* cited by examiner

FIG. 5

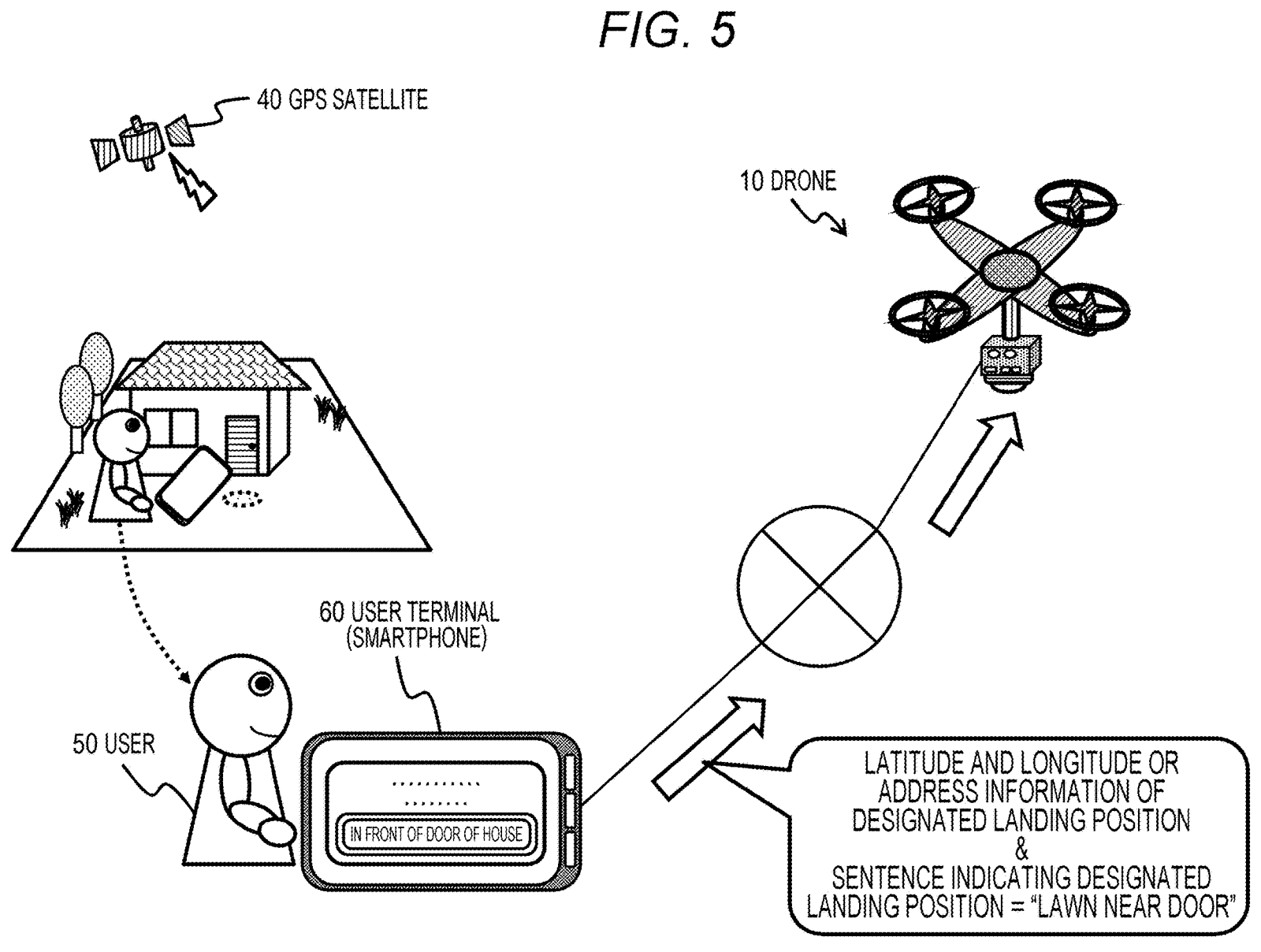

10 DRONE

40 GPS SATELLITE

60 USER TERMINAL (SMARTPHONE)

IN FRONT OF DOOR OF HOUSE

50 USER

LATITUDE AND LONGITUDE OR ADDRESS INFORMATION OF DESIGNATED LANDING POSITION
&
SENTENCE INDICATING DESIGNATED LANDING POSITION = "LAWN NEAR DOOR"

*FIG. 9*

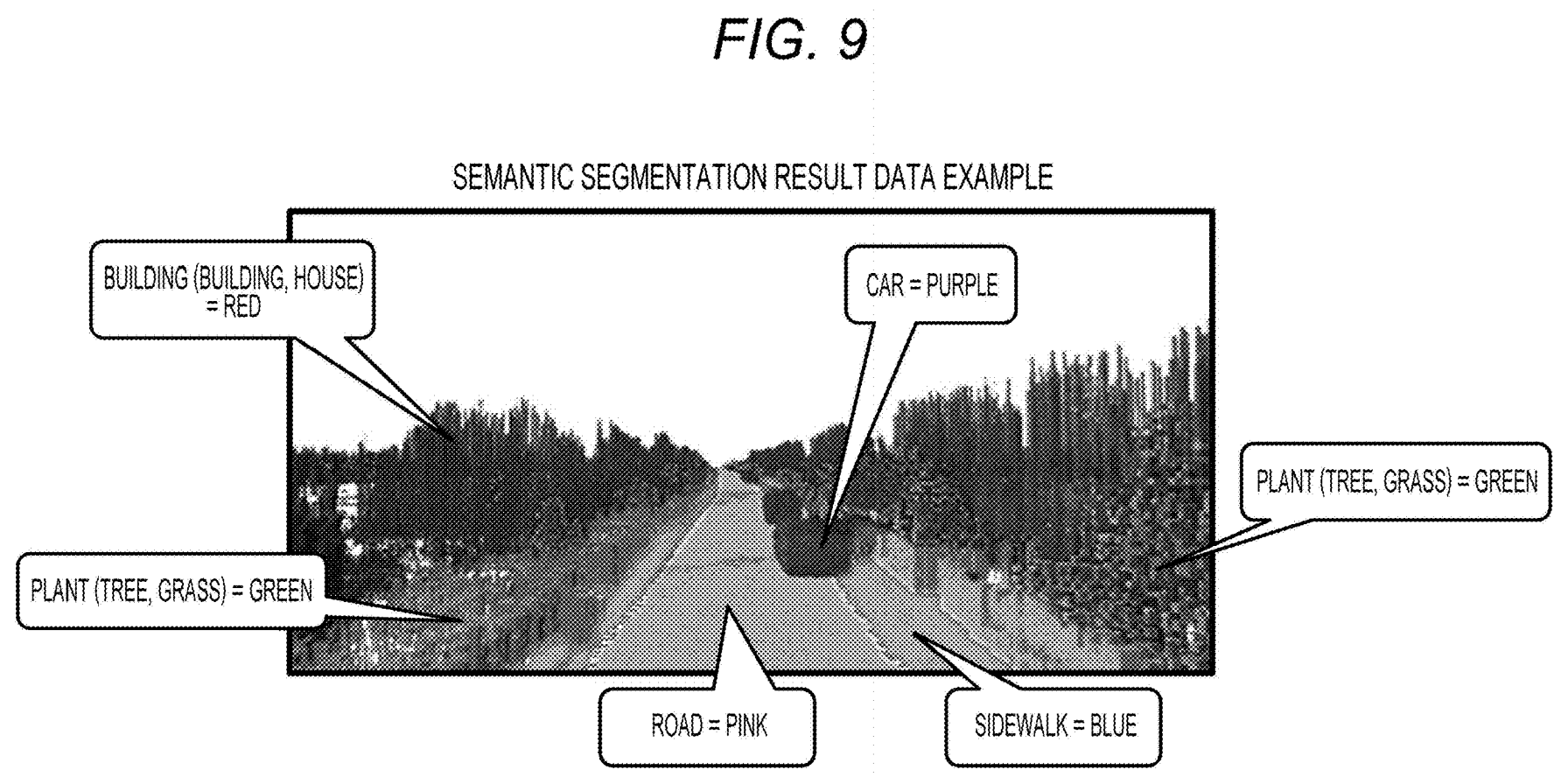

SEMANTIC SEGMENTATION RESULT DATA EXAMPLE

PLANT (TREE, GRASS) = GREEN

SIDEWALK = BLUE

CAR = PURPLE

ROAD = PINK

BUILDING (BUILDING, HOUSE) = RED

PLANT (TREE, GRASS) = GREEN

SENTENCE INDICATING DESIGNATED LANDING POSITION = "ドアの近くの芝生 (LAWN NEAR DOOR)"

| (a) USAGE DICTIONARY | (b) SENTENCE BOUNDARY LABEL | (c) WRITTEN FORM (SURFACE FORM) | (d) LEXICAL ELEMENT | (e) LEXICAL ELEMENT READING | (f) PART OF SPEECH | (g) MAJOR CLASSIFICATION | (h) MEDIUM CLASSIFICATION | (i) MINOR CLASSIFICATION |
|---|---|---|---|---|---|---|---|---|
| MODERN LANGUAGE | B | ドア (DOOR) | ドア (door) | ドア (DOA) | NOUN – COMMON NOUN – GENERAL | NOUN | COMMON NOUN | GENERAL |
| MODERN LANGUAGE | I | の (OF) | の (OF) | ノ (NO) | PARTICLE – CASE PARTICLE | PARTICLE | CASE PARTICLE | |
| MODERN LANGUAGE | I | 近く (NEAR) | 近く (NEAR) | チカク (CHIKAKU) | NOUN – COMMON NOUN – ADVERB POSSIBLE | NOUN | COMMON NOUN | ADVERB POSSIBLE |
| MODERN LANGUAGE | I | の (OF) | の (OF) | ノ (NO) | PARTICLE – CASE PARTICLE | PARTICLE | CASE PARTICLE | |
| MODERN LANGUAGE | I | 芝生 (LAWN) | 芝生 (LAWN) | シバフ (SHIBAFU) | NOUN – COMMON NOUN – GENERAL | NOUN | COMMON NOUN | GENERAL |

FIG. 16

SENTENCE INDICATING DESIGNATED LANDING POSITION = "LAWN NEAR DOOR"

DOOR = RED

LAWN = GREEN

80 TARGET LANDING POSITION

FIG. 17

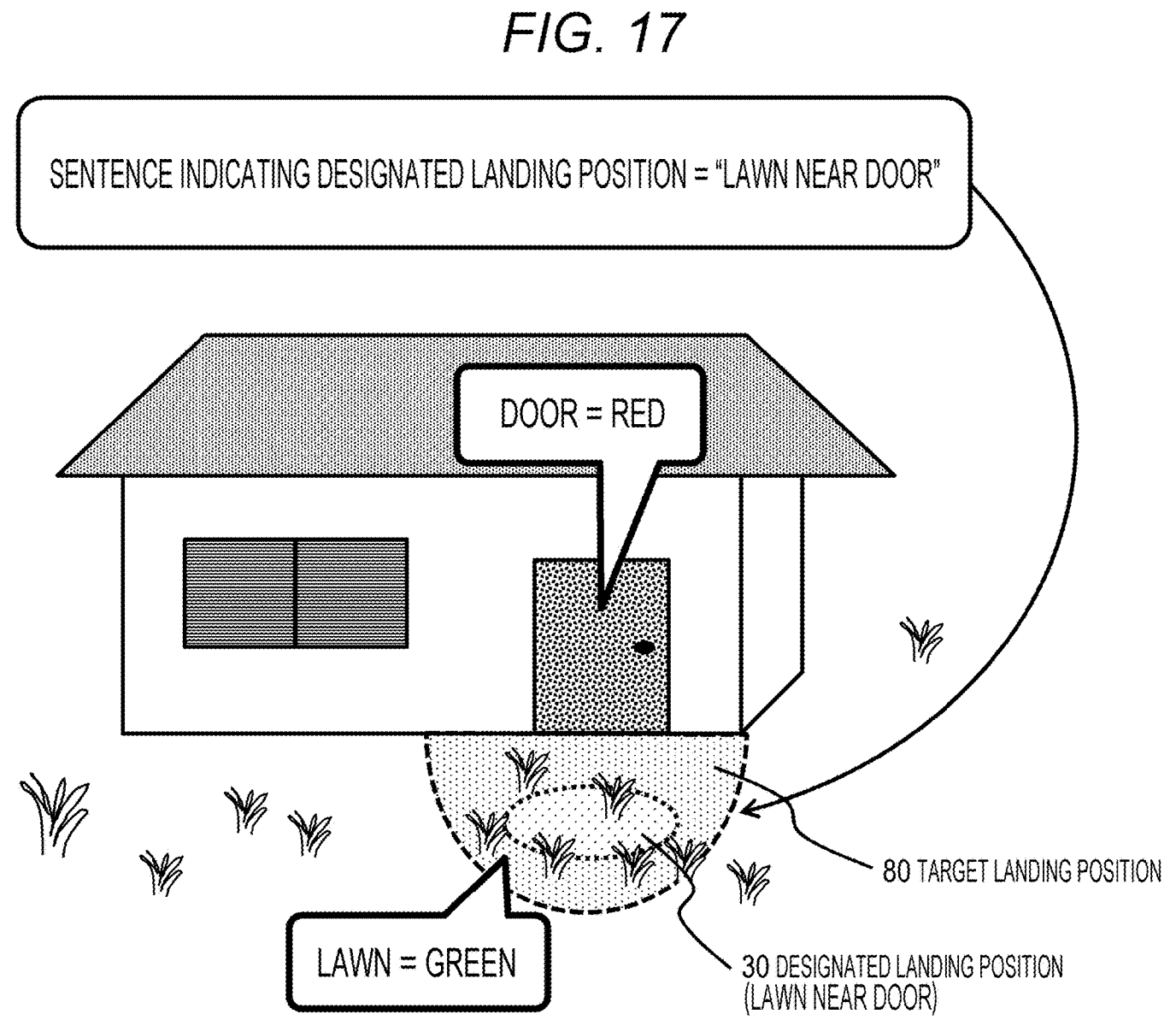

SENTENCE INDICATING DESIGNATED LANDING POSITION = "LAWN NEAR DOOR"

DOOR = RED

LAWN = GREEN

80 TARGET LANDING POSITION

30 DESIGNATED LANDING POSITION (LAWN NEAR DOOR)

DRONE

DRONE MANAGEMENT SERVER

USER TERMINAL

USER

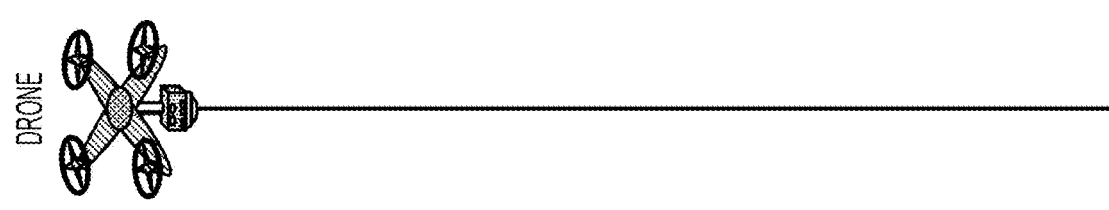

(S101)
INPUT DESIGNATED LANDING POSITION INFORMATION (INPUT GPS POSITION INFORMATION OR ADDRESS)

(S102)
INPUT SENTENCE INDICATING DESIGNATED LANDING POSITION (S103)
TRANSMIT DESIGNATED LANDING POSITION INFORMATION (GPS POSITION INFORMATION OR ADDRESS) AND SENTENCE INDICATING DESIGNATED LANDING POSITION (S104)
STORE DESIGNATED LANDING POSITION INFORMATION (GPS POSITION INFORMATION OR ADDRESS) AND SENTENCE INDICATING DESIGNATED LANDING POSITION IN STORAGE UNIT

*FIG. 26*

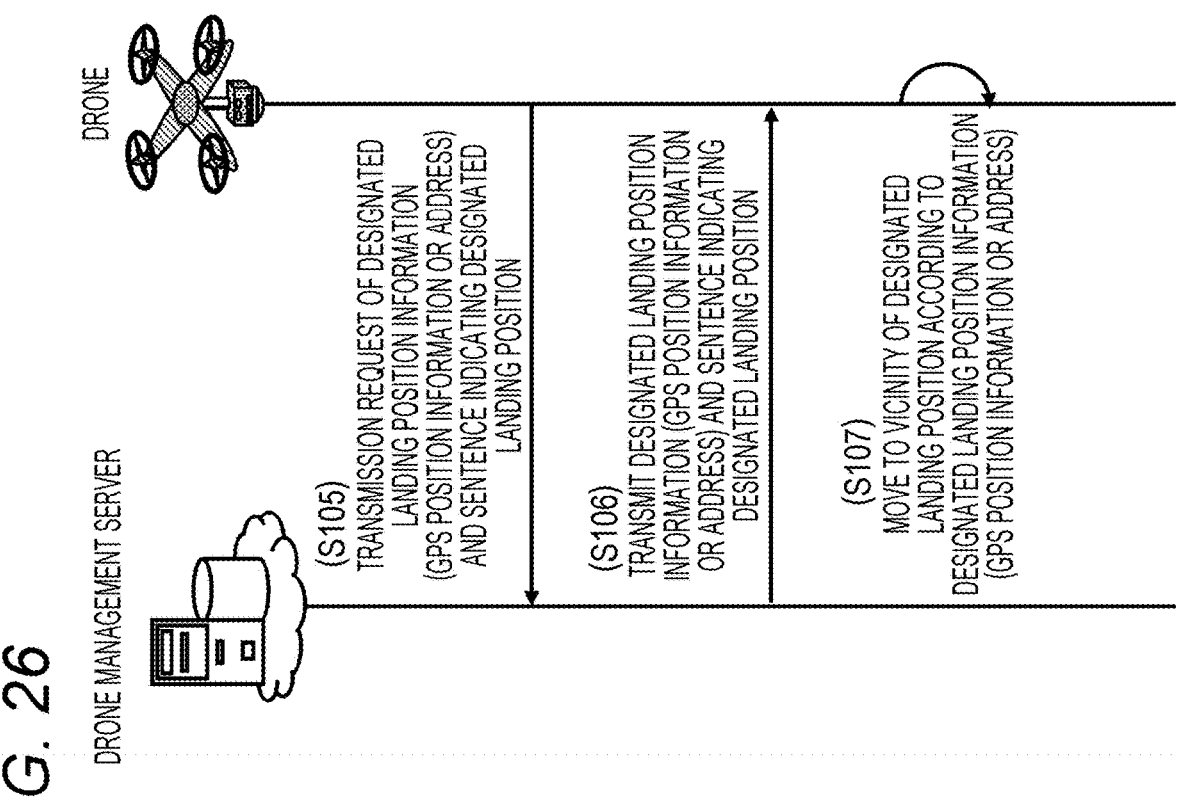

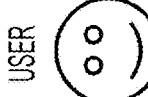

DRONE

DRONE MANAGEMENT SERVER (S105)
TRANSMISSION REQUEST OF DESIGNATED
LANDING POSITION INFORMATION
(GPS POSITION INFORMATION OR ADDRESS)
AND SENTENCE INDICATING DESIGNATED
LANDING POSITION (S106)
TRANSMIT DESIGNATED LANDING POSITION
INFORMATION (GPS POSITION INFORMATION
OR ADDRESS) AND SENTENCE INDICATING
DESIGNATED LANDING POSITION (S107)
MOVE TO VICINITY OF DESIGNATED
LANDING POSITION ACCORDING TO
DESIGNATED LANDING POSITION INFORMATION
(GPS POSITION INFORMATION OR ADDRESS)

USER TERMINAL

USER

*FIG. 27*

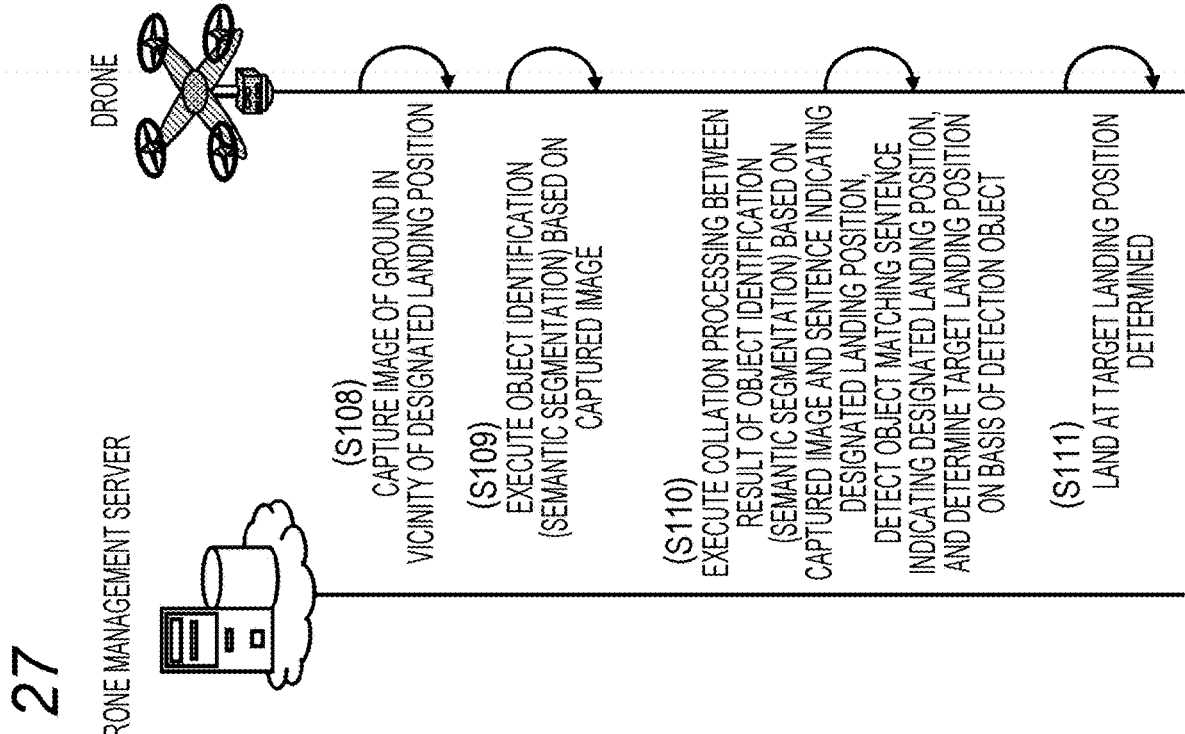

DRONE (S108)
CAPTURE IMAGE OF GROUND IN
VICINITY OF DESIGNATED LANDING POSITION (S109)
EXECUTE OBJECT IDENTIFICATION
(SEMANTIC SEGMENTATION) BASED ON
CAPTURED IMAGE (S110)
EXECUTE COLLATION PROCESSING BETWEEN
RESULT OF OBJECT IDENTIFICATION
(SEMANTIC SEGMENTATION) BASED ON
CAPTURED IMAGE AND SENTENCE INDICATING
DESIGNATED LANDING POSITION,
DETECT OBJECT MATCHING SENTENCE
INDICATING DESIGNATED LANDING POSITION,
AND DETERMINE TARGET LANDING POSITION
ON BASIS OF DETECTION OBJECT (S111)
LAND AT TARGET LANDING POSITION
DETERMINED

DRONE MANAGEMENT SERVER

USER TERMINAL

USER

*FIG. 28*

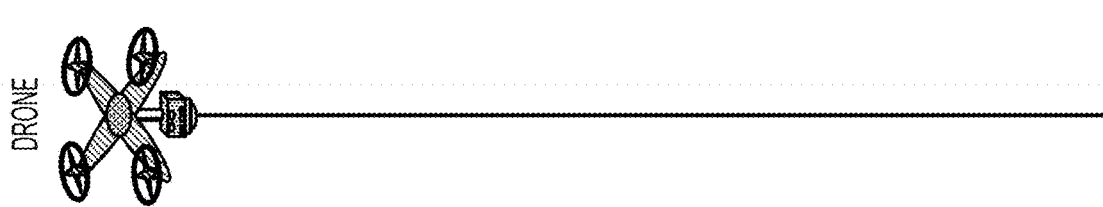

DRONE

DRONE MANAGEMENT SERVER

USER TERMINAL

USER (S201)
INPUT DESIGNATED LANDING POSITION INFORMATION (INPUT GPS POSITION INFORMATION OR ADDRESS)

(S202)
INPUT SENTENCE INDICATING DESIGNATED LANDING POSITION (S203)
TRANSMIT DESIGNATED LANDING POSITION INFORMATION (GPS POSITION INFORMATION OR ADDRESS) AND SENTENCE INDICATING DESIGNATED LANDING POSITION (S204)
STORE DESIGNATED LANDING POSITION INFORMATION (GPS POSITION INFORMATION OR ADDRESS) AND SENTENCE INDICATING DESIGNATED LANDING POSITION IN STORAGE UNIT

*FIG. 29*

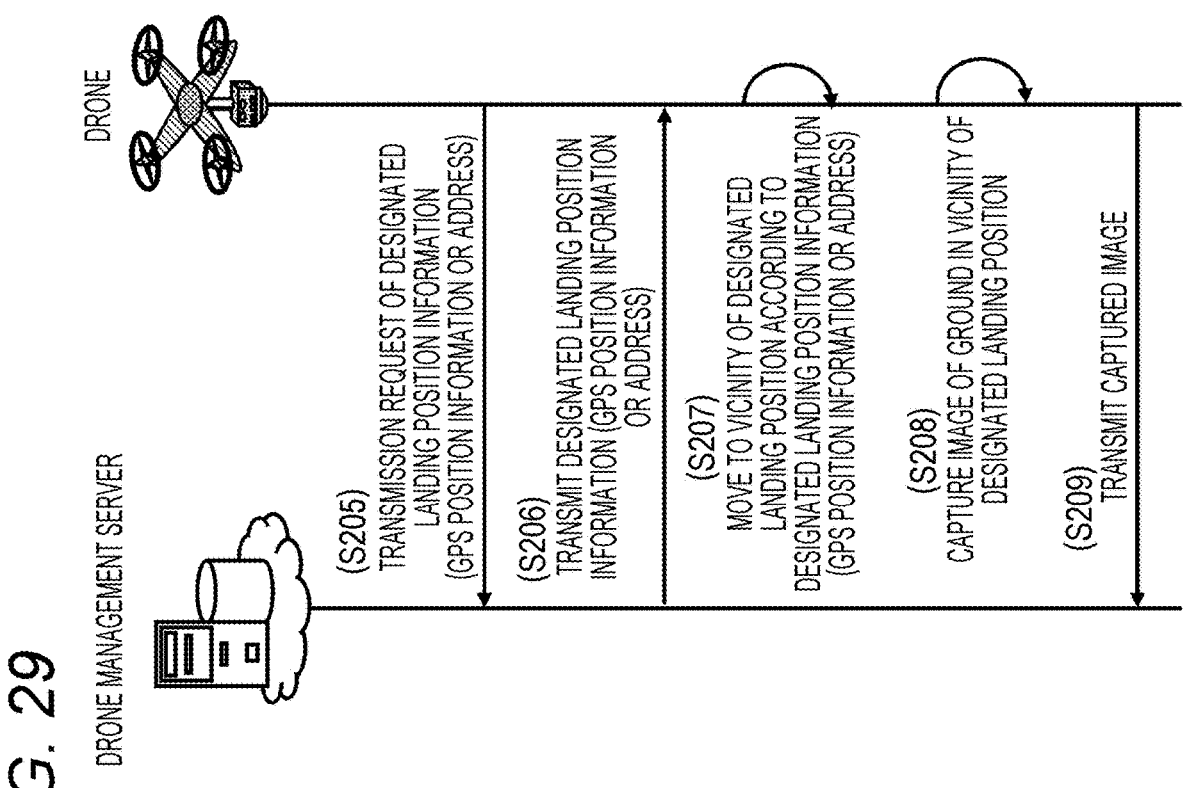

DRONE

DRONE MANAGEMENT SERVER (S205)
TRANSMISSION REQUEST OF DESIGNATED LANDING POSITION INFORMATION (GPS POSITION INFORMATION OR ADDRESS)

(S206)
TRANSMIT DESIGNATED LANDING POSITION INFORMATION (GPS POSITION INFORMATION OR ADDRESS)

(S207)
MOVE TO VICINITY OF DESIGNATED LANDING POSITION ACCORDING TO DESIGNATED LANDING POSITION INFORMATION (GPS POSITION INFORMATION OR ADDRESS)

(S208)
CAPTURE IMAGE OF GROUND IN VICINITY OF DESIGNATED LANDING POSITION (S209)
TRANSMIT CAPTURED IMAGE

USER TERMINAL

USER

*FIG. 32*

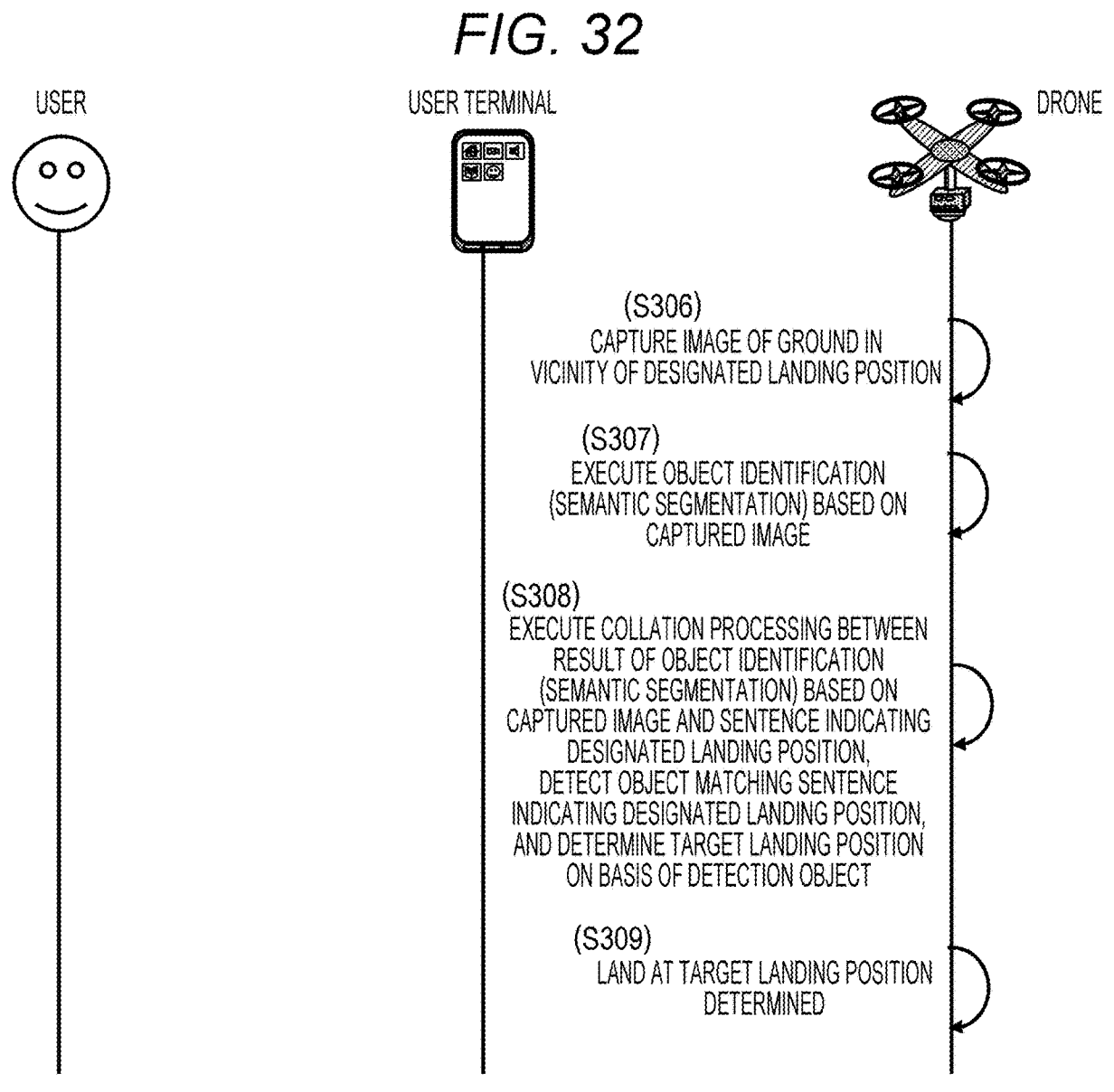

DRONE

USER TERMINAL

USER (S306)
CAPTURE IMAGE OF GROUND IN
VICINITY OF DESIGNATED LANDING POSITION (S307)
EXECUTE OBJECT IDENTIFICATION
(SEMANTIC SEGMENTATION) BASED ON
CAPTURED IMAGE (S308)
EXECUTE COLLATION PROCESSING BETWEEN
RESULT OF OBJECT IDENTIFICATION
(SEMANTIC SEGMENTATION) BASED ON
CAPTURED IMAGE AND SENTENCE INDICATING
DESIGNATED LANDING POSITION,
DETECT OBJECT MATCHING SENTENCE
INDICATING DESIGNATED LANDING POSITION,
AND DETERMINE TARGET LANDING POSITION
ON BASIS OF DETECTION OBJECT (S309)
LAND AT TARGET LANDING POSITION
DETERMINED

INFORMATION PROCESSING METHOD, PROCESSING APPARATUS, AND INFORMATION PROCESSING SYSTEM, AND PROGRAM

CROSS-REFERENCE TO RELATED APPLICATIONS

The present application is based on PCT filing PCT/JP2022/001991, filed Jan. 20, 2022, which claims priority to Japanese Patent Application No. 2021-030399, filed Feb. 26, 2021, the contents of each are hereby incorporated by reference.

TECHNICAL FIELD

The present disclosure relates to an information processing method, an information processing apparatus, and an information processing system, and a program. More specifically, the present technology relates to an information processing method, an information processing apparatus, and an information processing system, and a program that enable a mobile body such as a drone to land at a position designated by a user, for example.

BACKGROUND ART

In recent years, use of various autonomous mobile bodies such as drones, robots, and automated driving vehicles has increased. For example, a camera is mounted to a drone and used for processing of capturing an image of a landscape on the ground from the sky, or the like. Furthermore, utilization of drones for package deliveries is also planned, and various experiments have been conducted.

At present, in many countries, it is required to control a flight of a drone by operating a controller under supervision of a human, that is, within a range visible to the human. However, it is estimated that, in the future, there will be utilized many autonomous-flight drones that do not require visual supervision of a human, that is, drones that autonomously fly from a departure point to a destination.

Such an autonomous-flight drone flies from a departure point to a destination by utilizing, for example, communication information with a control center or GPS position information.

One specific use form of autonomous-flight drones is package delivery by drones. In a case where package delivery is performed by drones, it is convenient for the user who requests package delivery to land a drone carrying the package addressed to the user in front of the door of the user's house to receive the package. However, it is difficult to reliably find the landing position desired by the user from the drone side.

As a method for landing the drone at the target position, for example, there is a method of using GPS position information. However, errors of several meters often occur in latitude and longitude information used as GPS position information, and it is difficult to reliably land in an extremely narrow range such as in front of a door of a house only with the GPS position information.

Furthermore, as a method for landing the drone at a target position, there is a method of recording a marker at a landing target position, capturing an image of the marker with a camera mounted on the drone, and landing toward the marker included in the captured image.

However, having the user requesting package delivery create a marker visible from the sky is a heavy user burden and practically difficult.

Note that Patent Document 1 (Japanese Patent Application Laid-Open No. 2018-506475) is a conventional technology that discloses a configuration for landing a drone at a target position by highly accurate position control.

Patent Document 1 discloses a configuration by which a drone is landed at a target position by highly accurate position control using an optical sensor, a short range sensor, a high frequency system (RF system) for performing triangulation, and the like in addition to the position control by the GPS.

However, the configuration described in Patent Document 1 is a configuration for accurately landing at a charging system position provided for charging a drone, and is a configuration for controlling the landing position by providing a special apparatus such as a transmitter for guiding the drone to the charging system side which is the landing position.

Therefore, for example, the present invention cannot be applied to the landing position control to a position that does not have special equipment such as a user's yard or in front of an entrance.

CITATION LIST

Patent Document

Patent Document 1: Japanese Patent Application Laid-Open No. 2018-506475

SUMMARY OF THE INVENTION

Problems to be Solved by the Invention

The present disclosure has been made in view of the above problems, for example, and an object thereof is to provide an information processing method, an information processing apparatus, and an information processing system, and a program capable of landing a mobile body such as a drone at a position designated by a user with high accuracy.

Solutions to Problems

A first aspect of the present disclosure is
an information processing method executed in an information processing apparatus, the information processing method including
a data processing unit executing:
object identification processing of analyzing a captured image of a camera mounted on a mobile body and identifying an object type of a subject included in the captured image;
sentence analysis processing of analyzing a sentence indicating a designated arrival position of the mobile body;
word-corresponding subject selection processing of collating a result of the sentence analysis processing with a result of the object identification processing and selecting a subject corresponding to a word included in the sentence indicating the designated arrival position from the captured image; and
target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body.

Further, a second aspect of the present disclosure is an information processing apparatus including a data processing unit that determines a target arrival position of a mobile body, the data processing unit executing:

object identification processing of analyzing a captured image of a camera mounted on the mobile body and identifying an object type of a subject included in the captured image;

sentence analysis processing of analyzing a sentence indicating a designated arrival position of the mobile body;

word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as the target arrival position of the mobile body.

Further, a third aspect of the present disclosure is an information processing system including a mobile body, a user terminal, and a drone management server, in which the user terminal transmits a sentence indicating a designated arrival position of the mobile body to the drone management server, the drone management server transfers the sentence indicating the designated arrival position received from the user terminal to the mobile body, and the mobile body executes:

object identification processing of analyzing a captured image of a camera mounted on the mobile body and identifying an object type of a subject included in the captured image;

sentence analysis processing of analyzing the sentence indicating the designated arrival position received from the drone management server;

word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body.

Further, a fourth aspect of the present disclosure is an information processing system including a mobile body, a user terminal, and a drone management server, in which the user terminal transmits a sentence indicating a designated arrival position of the mobile body to the drone management server, the mobile body transmits a captured image of a camera mounted on the mobile body to the drone management server, and the drone management server executes:

object identification processing of analyzing the captured image received from the mobile body and identifying an object type of a subject included in the captured image;

sentence analysis processing of analyzing the sentence indicating the designated arrival position received from the user terminal;

word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body, and transmits the determined target arrival position to the drone.

Further, a fifth aspect of the present disclosure is an information processing system including a mobile body and a user terminal, in which a user terminal transmits a sentence indicating a designated arrival position of the mobile body to the mobile body, and the mobile body executes:

object identification processing of analyzing a captured image of a camera mounted on the mobile body and determining an object type of a subject included in the captured image;

sentence analysis processing of analyzing a sentence indicating the designated arrival position received from the user terminal;

word-corresponding subject selection processing of collating a result of the sentence analysis processing with a result of the object identification processing and selecting a subject corresponding to a word included in a sentence indicating the designated arrival position from the captured image; and target arrival position determination processing of extracting an area corresponding to a designated arrival position indicated by a sentence indicating the designated arrival position from the captured image on the basis of a result of the word-corresponding subject selection processing, and determining the extraction area as a target arrival position of the mobile body.

Further, a sixth aspect of the present disclosure is a program for executing information processing executed in an information processing apparatus, the program causing a data processing unit to execute:

object identification processing of analyzing a captured image of a camera mounted on a mobile body and identifying an object type of a subject included in the captured image;

sentence analysis processing of analyzing a sentence indicating a designated arrival position of the mobile body;

word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body.

Note that the program of the present disclosure is, for example, a program that can be provided to an information processing apparatus or a computer system capable of executing various program codes by a storage medium or a communication medium that provides the program codes in a computer-readable format. By providing such a program in a computer-readable format, processing according to the program can be performed in the information processing apparatus or computer system.

Other objects, features, and advantages of the present disclosure will become apparent from the detailed description based on the embodiments of the present disclosure described later and the accompanying drawings. Note that a system in the present specification is a logical set configuration of a plurality of apparatuses, and is not limited to one in which apparatuses with respective configurations are in the same housing.

According to a configuration of an embodiment of the present disclosure, a configuration that enables determination of a target landing position of a drone according to a sentence indicating a landing position generated by a user is realized.

Specifically, for example, object identification processing of analyzing a captured image of a camera mounted on a mobile body and identifying an object type of a subject included in the captured image; sentence analysis processing of analyzing a sentence indicating a designated arrival position of the mobile body; word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body are executed.

With this configuration, a configuration is realized in which the target landing position of the drone can be determined according to the sentence indicating the landing position generated by the user.

Note that the effects described herein are only examples and are not limited thereto, and additional effects may also be present.

BRIEF DESCRIPTION OF DRAWINGS

FIG. 5 is a diagram illustrating a processing example of transmitting data input by a user to a user terminal such as a smartphone to a drone.

FIG. 6 is a diagram illustrating a processing example of transmitting data input by a user to a user terminal such as a smartphone to a drone management server that performs flight control of a drone or the like.

FIG. 9 is a diagram for explaining semantic segmentation performed as object analysis processing.

FIG. 10 is a diagram for explaining an example of an object analysis image in which colors according to object types included in a captured image are output by semantic segmentation.

FIG. 13 is a diagram for explaining a specific example of morphological analysis processing of a sentence indicating a designated landing position generated by a user.

FIG. 16 is a diagram for explaining a specific example of a process of determining a position in the real space to which the designated position of the sentence determined by the morphological analysis processing of the sentence indicating the designated landing position generated by the user corresponds.

FIG. 17 is a diagram for explaining a specific example of a process of determining a position in the real space to which the designated position of the sentence determined by the morphological analysis processing of the sentence indicating the designated landing position generated by the user corresponds.

FIG. 18 is a diagram illustrating a result of object identification (semantic segmentation) processing executed using a certain piece of object identification dictionary data (learned data).

FIG. 20 is an example of a representative similar word dictionary, and is a diagram for explaining a specific example of a Word2Vec dictionary that enables a search for a word having high similarity for each word.

FIG. 24 is a diagram for explaining a specific example of a process of determining a position in a real space to which a designated position of a sentence corresponds by using a similar word dictionary for a morphological analysis result of the sentence indicating a designated landing position.

FIG. 25 is a sequence diagram for explaining a processing sequence of target landing position determination processing of the present disclosure.

FIG. 26 is a sequence diagram for explaining a processing sequence of target landing position determination processing of the present disclosure.

FIG. 27 is a sequence diagram for explaining a processing sequence of target landing position determination processing of the present disclosure.

FIG. 28 is a sequence diagram for explaining a processing sequence of target landing position determination processing of the present disclosure.

FIG. 29 is a sequence diagram for explaining a processing sequence of target landing position determination processing of the present disclosure.

FIG. 32 is a sequence diagram for explaining a processing sequence of target landing position determination processing of the present disclosure.

MODE FOR CARRYING OUT THE INVENTION

Figure 1:
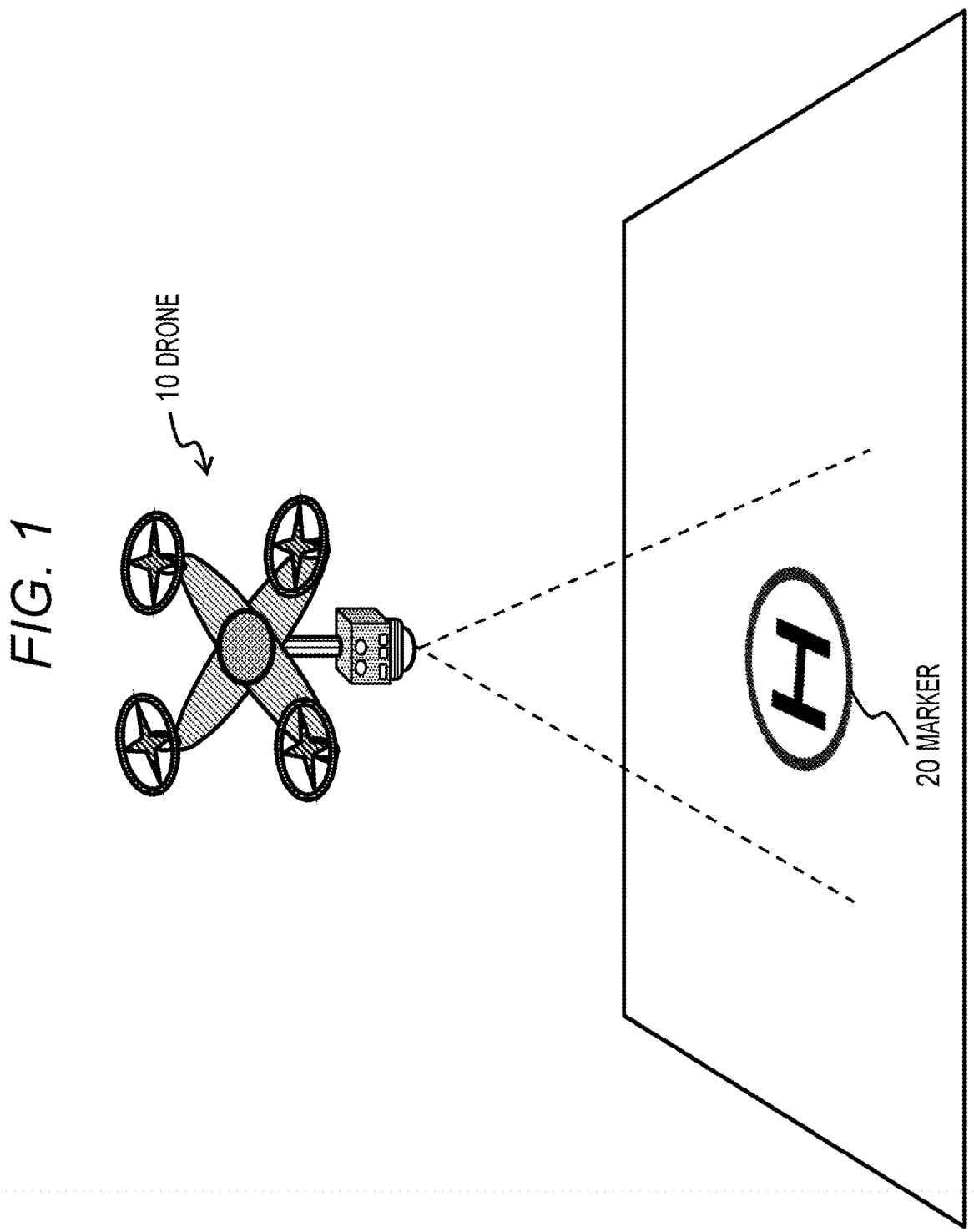
FIG. 1 is a diagram for explaining a landing processing example of a drone using a marker.

Hereinafter, details of an information processing method, an information processing apparatus, an information processing system, and a program of the present disclosure will be described with reference to the drawings. Note that the description will be given according to the following items.

1. General Landing Processing Example on Target Position of Drone and Problems
2. Landing Position Determination Processing of Drone Executed by Information Processing Apparatus of Present Disclosure
3. Processing Example in Case Where It Is Difficult to Specify Identification Object by Object Identification Processing (Semantic Segmentation) From Sentence Indicating Designated Landing Position Generated by User 4. Processing Sequence of Target Landing Position Determination Processing of Drone Executed by Information Processing Apparatus of Present Disclosure
4-1. (Processing Example 1) Processing Example in Which User Terminal Transmission Data Including Designated Landing Position Information (GPS Position or Address) And Sentence Indicating Designated Landing Position Is Transmitted From User Terminal to Drone Management Server, Thereafter, User Terminal Transmission Data Is Transferred From Drone Management Server to Drone, and Drone Determines Flight Path and Landing Position on Basis of User Terminal Transmission Data and Lands
4-2. (Processing Example 2) Processing Example in Which User Terminal Transmission Data Including Designated Landing Position Information (GPS Position or Address) And Sentence Indicating Designated Landing Position Is Transmitted From User Terminal to Drone Management Server, Thereafter, Drone Management Server Determines Flight Path and Landing Position of Drone on Basis of User Terminal Transmission Data, Notifies Drone of Determination Information, and Flies and Lands Drone
4-3. (Processing Example 3) Processing Example in Which User Terminal Transmission Data Including Designated Landing Position Information (GPS Position or Address) And Sentence Indicating Designated Landing Position Is Transferred From User Terminal to Drone, and Drone Determines Flight Path and Landing Position on Basis of User Terminal Transmission Data and Lands
5. Configuration Example of Apparatus Used in Processing of Present Disclosure
6. Summary of Configurations of Present Disclosure 1. General Landing Processing Example on Target Position of Drone and Problems First, a general landing processing example on a target position of a drone and problems will be described.

As described above, in recent years, the use of drones has rapidly increased. For example, drones are used for processing of capturing a landscape on the ground from the sky by mounting a camera on a drone, and processing of analyzing a growth situation of crops on the ground. In the future, it is also planned to use drones for package delivery.

For example, in a case where a drone is used for package delivery, an autonomous-flight drone that does not require visual supervision by a person, that is, an autonomous-flight drone that autonomously flies from a departure point toward a destination is required.

The autonomous-flight drone flies from the departure point to the destination using, for example, communication information with a control center or GPS position information.

In a case where the package delivery is performed by the autonomous-flight drone, it is convenient for the user who has requested the package delivery to land the drone carrying the package addressed to the user in front of the door of the user's house to receive the package.

However, as described above, it is difficult to reliably find the landing position desired by the user from the drone side. For example, in a case where GPS positional information is used, an error of several meters often occurs, and it is difficult to accurately land in an extremely narrow range such as in front of a door of a house.

Further, there is a method of using a marker as illustrated in FIG. 1.

As illustrated in FIG. 1, a marker 20 is recorded at a target landing position to be a target landing of a drone 10. The drone 10 captures an image of the marker 20 with a camera mounted on the drone, and lands toward the marker included in the captured image.

However, having the user requesting package delivery create a marker visible from the sky as illustrated in FIG. 1 is a heavy user burden and practically difficult.

The present disclosure solves such a problem, and makes it possible to accurately land a drone at a position desired by a user, for example, in a yard of the user or in front of an entrance.

Hereinafter, the configuration and processing of the present disclosure will be described.

2. Landing Position Determination Processing of Drone Executed by Information Processing Apparatus of Present Disclosure Next, landing position determination processing of the drone executed by the information processing apparatus of the present disclosure will be described.

Figure 2:
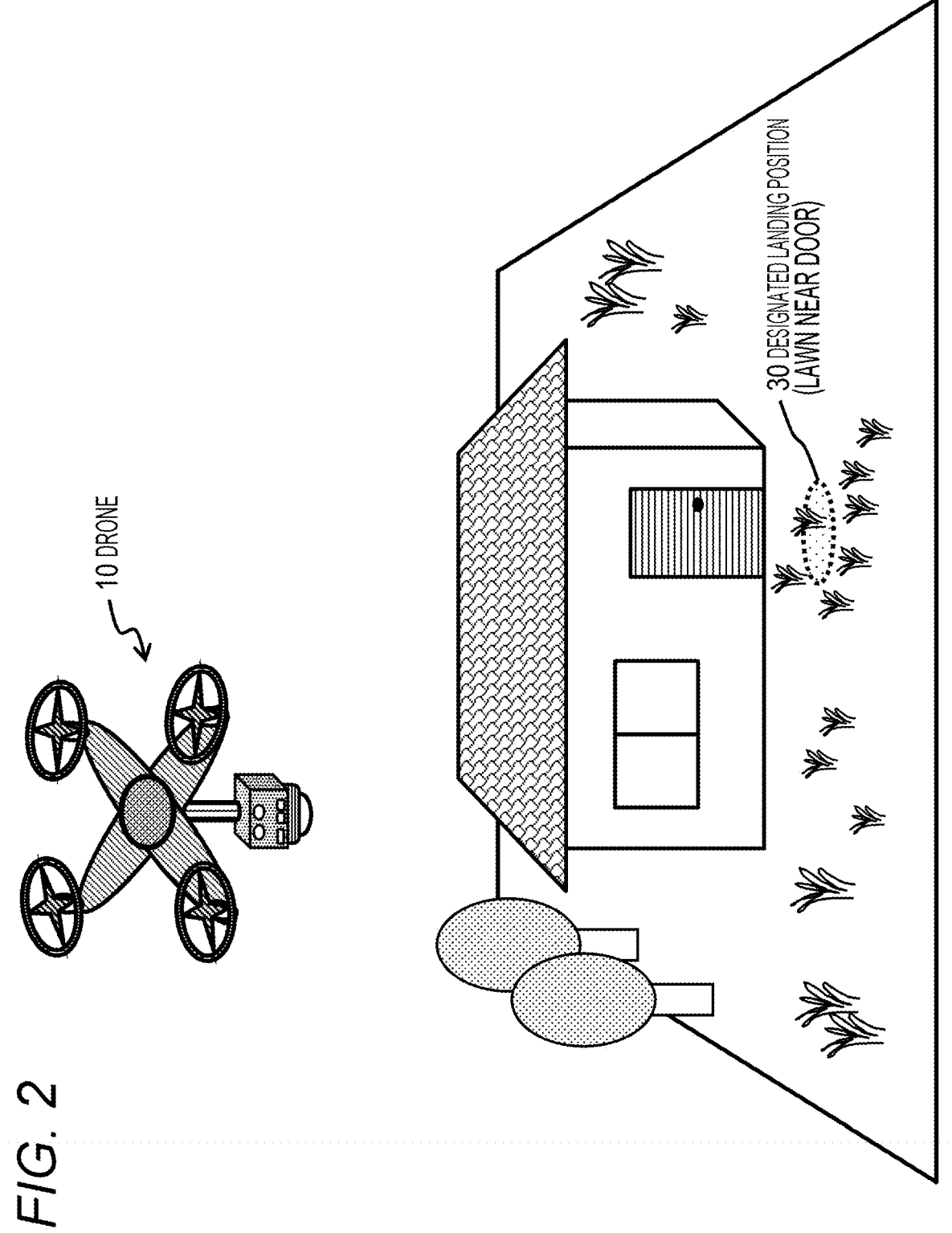
FIG. 2 is a diagram for explaining processing of the present disclosure of landing a drone at a designated landing position designated by a user without using a marker.

The landing control processing of the drone of the present disclosure enables the drone 10 to accurately land in an extremely narrow range such as in front of a door of a house, for example, as illustrated in FIG. 2.

FIG. 2 is a diagram illustrating an example of a designated landing position 30 designated by the user.

Note that, in FIG. 2, a dotted elliptical area is illustrated as the designated landing position 30, but this is merely an area drawn on the drawing to indicate a place, and there is no figure or marker such as a dotted line indicating this area in front of an actual house.

That is, the designated landing position 30 indicated by a dotted line in the figure is, for example, an area indistinguishable from other areas in the front yard of the house.

For example, the user of the house illustrated in FIG. 2 who has requested the package delivery by the drone 10 desires to land the drone 10 at the designated landing position 30 illustrated in FIG. 2, that is, in an area in front of the door of his/her house and to receive the package carried by the drone.

Processing performed by the user in such a case will be described with reference to FIG. 3.

Figure 3:
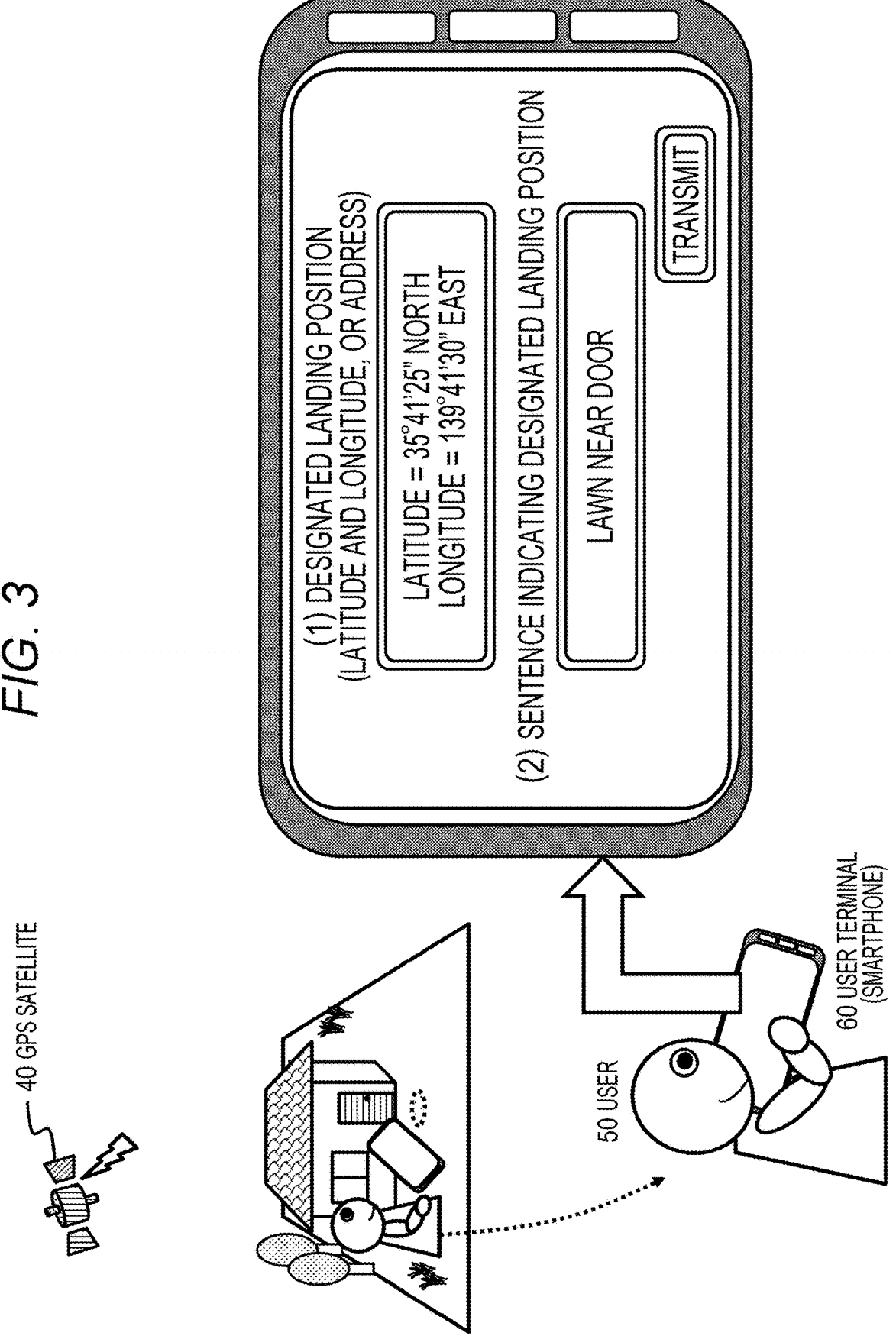
FIG. 3 is a diagram for explaining processing performed by a user to land a drone at a user-designated landing position.

It is assumed that a user 50 illustrated in FIG. 3 is a resident of the house illustrated in FIG. 2 and wishes to land the drone 10 at the designated landing position 30 described with reference to FIG. 2, that is, in an area in front of the door of his house.

In this case, the user 50 inputs each of the following data to a user terminal 60 such as a smartphone.

(1) Designated landing position (latitude and longitude, or address)

(2) Sentence indicating designated landing position

In the "(1) designated landing position (latitude and longitude, or address)", latitude and longitude data or address data corresponding to the designated landing position is input.

In a case where the user 50 is currently in a house having a designated landing position and the user terminal 60 such as a smartphone has a GPS function, it is only required to input latitude and longitude data of the current position obtained from a GPS satellite 40.

The example illustrated in FIG. 3 illustrates an example in which latitude-longitude data obtained from the GPS satellite 40 is input.

On the other hand, in a case where the user terminal 60 such as a smartphone does not have a GPS function or in a case where the current location of the user 50 is different from the designated landing position, the user 50 is only required to input the address of the house of the user 50.

Figure 4:
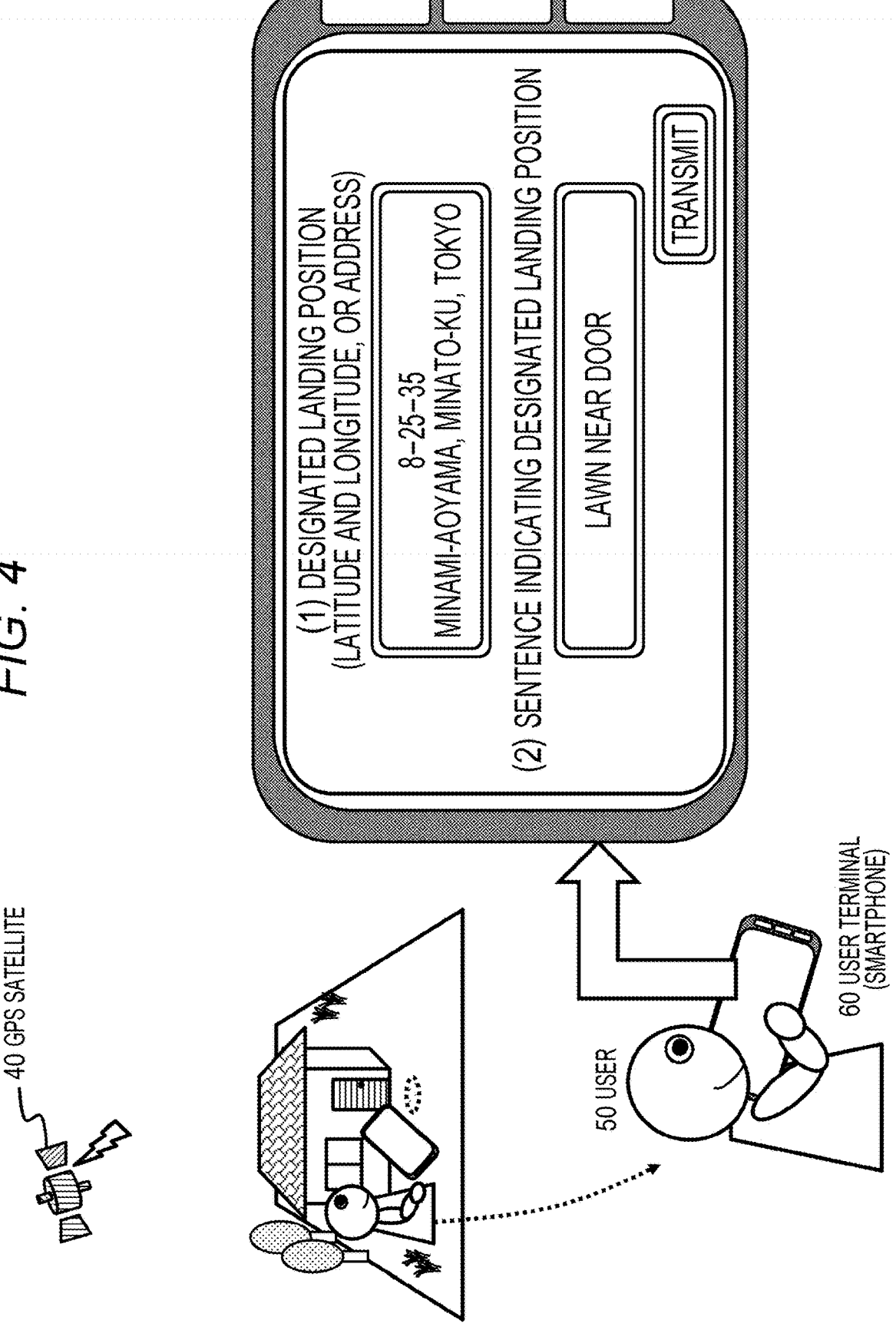
FIG. 4 is a diagram for explaining processing performed by a user to land a drone at a user-designated landing position.

The example illustrated in FIG. 4 illustrates an example in which address data is input to "(1) designated landing position (latitude and longitude, or address)".

In an input field of "(2) sentence indicating designated landing position", the user 50 inputs a sentence describing a position where the user desires to land the drone.

For example, as in the examples illustrated in FIGS. 3 and 4, such a sentence as
"lawn near door"
is input.

As illustrated in FIGS. 3 and 4, the user 50 inputs each data of (1) designated landing position (latitude and longitude, or address) and (2) sentence indicating designated landing position, and clicks the transmission button to transmit the input data.

The transmission destination of the data is the drone 10 or a server (drone management server) that performs flight management of the drone 10.

The information processing apparatus of the present disclosure that performs the landing position determination processing of the drone is configured in the drone 10 or a server (drone management server) that performs flight management of the drone 10.

FIG. 5 is a diagram illustrating a processing example of transmitting data input by the user 50 to the user terminal 60 such as a smartphone to the drone 10.

The input data is transmitted to the drone 10 via the communication network.

By this data transmission processing, the drone 10 receives each of the user input data, that is, (1) designated landing position (latitude and longitude, or address) and (2) sentence indicating designated landing position.

The drone 10 uses these pieces of reception data to fly to and land at the designated landing position designated by the user 50.

Details of the flight processing and the landing processing will be described later.

Figure 6:
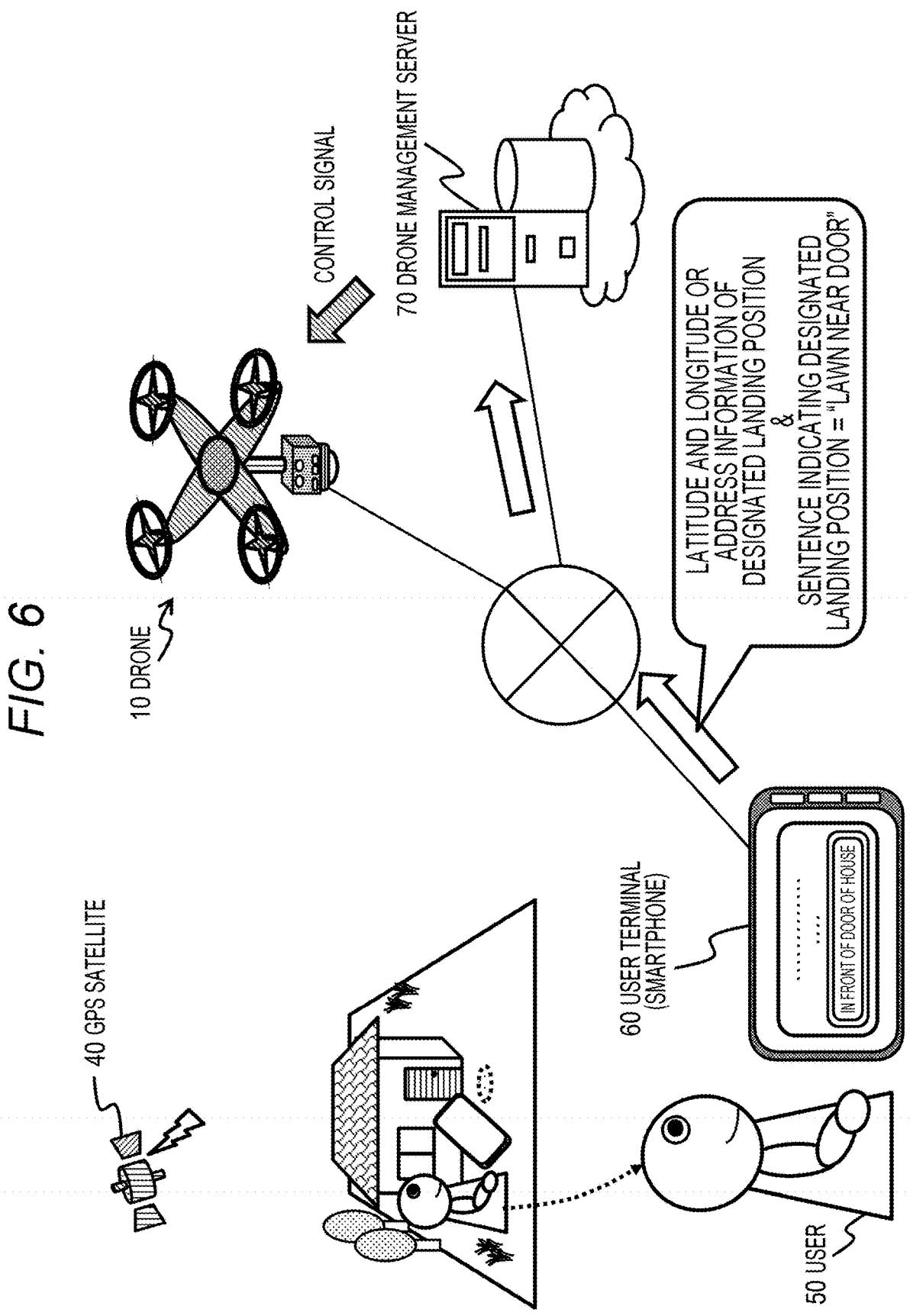

On the other hand, FIG. 6 is a diagram illustrating a processing example of transmitting data input by the user 50 to the user terminal 60 such as a smartphone to a drone management server 70 that performs flight control and the like of the drone 10.

The input data is transmitted to the drone management server 70 via the communication network.

By this data transmission processing, the drone management server 70 receives each of the user input data, that is, (1) designated landing position (latitude and longitude, or address) and (2) sentence indicating designated landing position.

Using these pieces of reception data, the drone management server 70 generates a control signal for flight to a designated landing position designated by the user 50 and landing, and transmits the control signal to the drone 10. The drone 10 executes a flight to a designated landing position designated by the user 50 and a landing processing according to the control signal received from the drone management server 70.

Alternatively, the drone management server 70 transfers data received from the user terminal 60, that is, (1) designated landing position (latitude and longitude, or address) and (2) sentence indicating designated landing position to the drone 10, and the drone 10 may analyze the data to fly to the designated landing position and land.

A detailed sequence of these processes will be described later.

Next, a specific example of flight processing and landing processing of the drone 10 will be described with reference to FIG. 7 and subsequent drawings.

Figure 7:
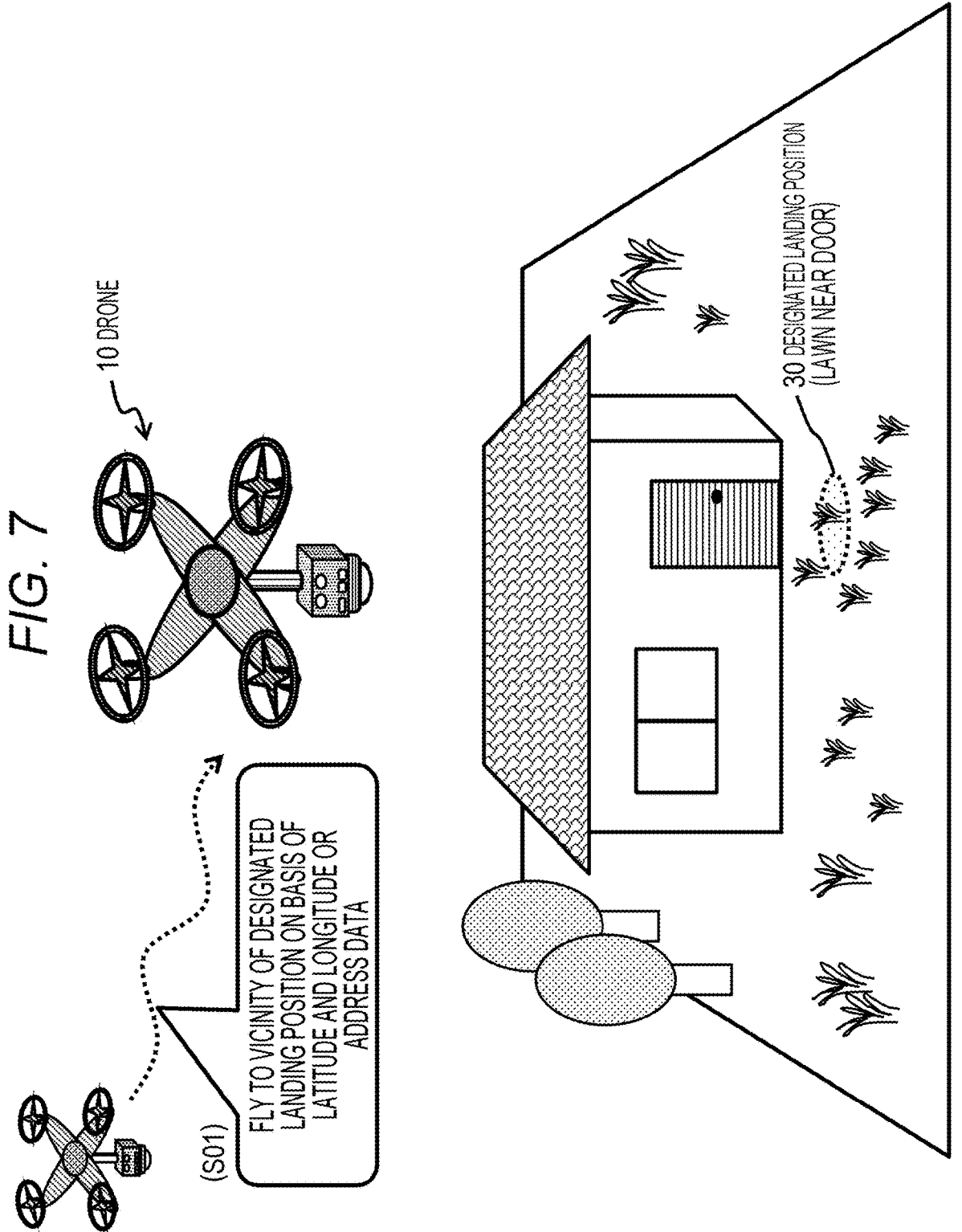
FIG. 7 is a diagram for explaining a specific example of flight processing and landing processing of a drone to which the processing of the present disclosure is applied.

First, as illustrated in step S01 of FIG. 7, the drone 10 flies to the vicinity of the designated landing position 30 according to the latitude and longitude information or the address information.

The latitude and longitude information or the address information corresponds to the user input data described with reference to FIGS. 4 to 6, that is, (1) designated landing position (latitude and longitude, or address).

The drone 10 flies to the vicinity of the designated landing position 30 on the basis of the latitude and longitude information or the address data corresponding to the designated landing position 30 which is the user input data.

In a case where the drone 10 performs autonomous flight, it is possible to analyze its own latitude and longitude position on the basis of, for example, a GPS signal. In a case where the data input by the user is latitude and longitude information, the drone flies to a place where the self-position matches the latitude and longitude information input by the user.

In a case where the data input by the user is not the latitude and longitude information but the address data, the address is converted into the latitude and longitude information using the address/latitude-longitude correspondence data. Thereafter, the drone flies to a position at which the latitude and longitude position of the own vehicle analyzed on the basis of the GPS signal matches the converted latitude and longitude position corresponding to the address.

Note that the address/latitude-longitude correspondence data is stored in a storage unit inside the drone 10 and used. Alternatively, the information may be stored in a storage unit in the drone management server 70 communicable with the drone 10, and the latitude and longitude information corresponding to the address may be analyzed using the server stored data.

Figure 8:
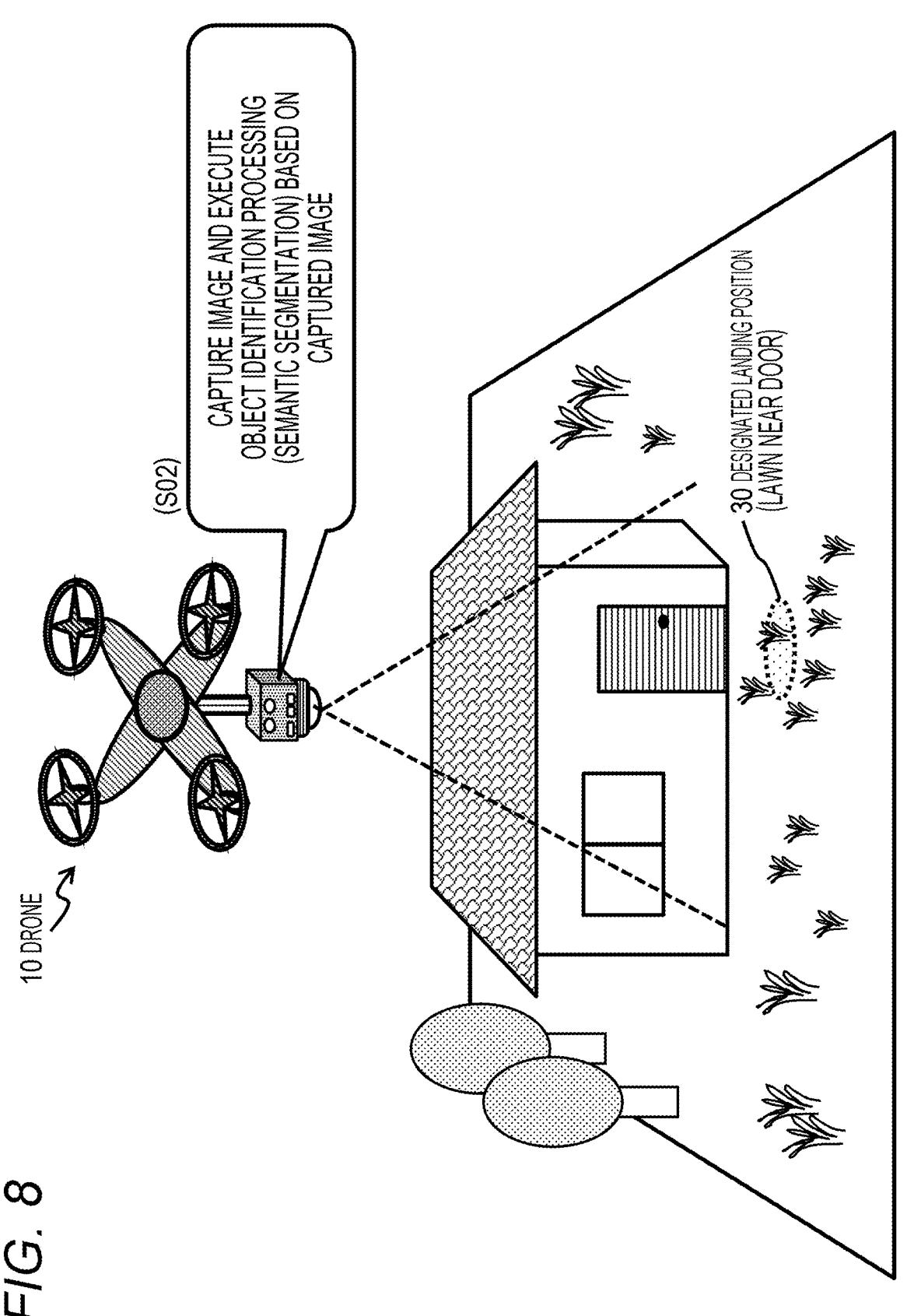
FIG. 8 is a diagram for explaining a specific example of flight processing and landing processing of a drone to which the processing of the present disclosure is applied.

As illustrated in FIG. 7, when the drone 10 flies to the vicinity of the designated landing position 30 on the basis of the latitude and longitude information or the address data corresponding to the designated landing position 30 as the user input data and reaches the sky in the vicinity of the designated landing position 30, the drone 10 next executes the processing of step S02 illustrated in FIG. 8.

As illustrated in (Step S02) of FIG. 8, the drone 10 captures an image with a camera mounted on the drone 10 from the sky, and executes object analysis processing of each of various subjects included in the captured image.

Specifically, this object analysis processing can be executed as processing using semantic segmentation, for example.

Semantic segmentation is a type of image recognition processing, and is processing of identifying an object type of a subject in an image using deep learning, and is processing of setting a pixel value (color) corresponding to an object to an object constituent pixel according to the identified object type.

Object identification is performed for each subject in the captured image, and a preset color is set according to an identification result. For example, if the identification object is a car, the color is purple, and if the identification object is a building, the color is red.

This semantic segmentation is a technology of identifying which object category each of constituent pixels (pixels) of an image belongs to, on the basis of, for example, a matching degree between object identification dictionary data (learned data) in which shape information and other feature information of various actual objects are registered and an object in a camera-imaged image.

With this semantic segmentation, it is possible to identify various objects included in the camera-imaged image, for example, types of objects such as a person, a car, a building, a road, a tree, a pond, and lawn.

An example of an object identification result by semantic segmentation is illustrated in FIG. 9.

FIG. 9 is an image illustrating an example of an application result of semantic segmentation to a camera-imaged image obtained by imaging the front side using a camera mounted on a vehicle traveling on a road.

By the semantic segmentation processing, pixels constituting objects that are various subjects in the captured image are set to predetermined colors according to object types and output.

That is, the object type of the pixel portion can be determined on the basis of the output color.

In the example illustrated in FIG. 9, for object type=car, output color=purple, for object type=building, output color=red, for object type=plant, output color=green, for object type=road, output color=pink, and for object type=sidewalk, output color=blue.

By the semantic segmentation processing, an image in which such output colors corresponding to the object types are set can be output.

Note that, as described above, the semantic segmentation is a method of identifying which object category each of the constituent pixels (pixels) of the image belongs to, on the basis of the matching degree between the object identification dictionary data (learned data) in which the shape information and other feature information of various actual objects are registered and the object in the camera-imaged image, and the result that object type=unknown is output for a subject having a feature not recorded in the dictionary data.

In step S02 illustrated in FIG. 8, the drone 10 captures an image with a camera mounted on the drone 10 from the sky, and executes object analysis processing of each of various subjects included in the captured image. That is, object identifier processing using semantic segmentation is executed.

Figure 10:
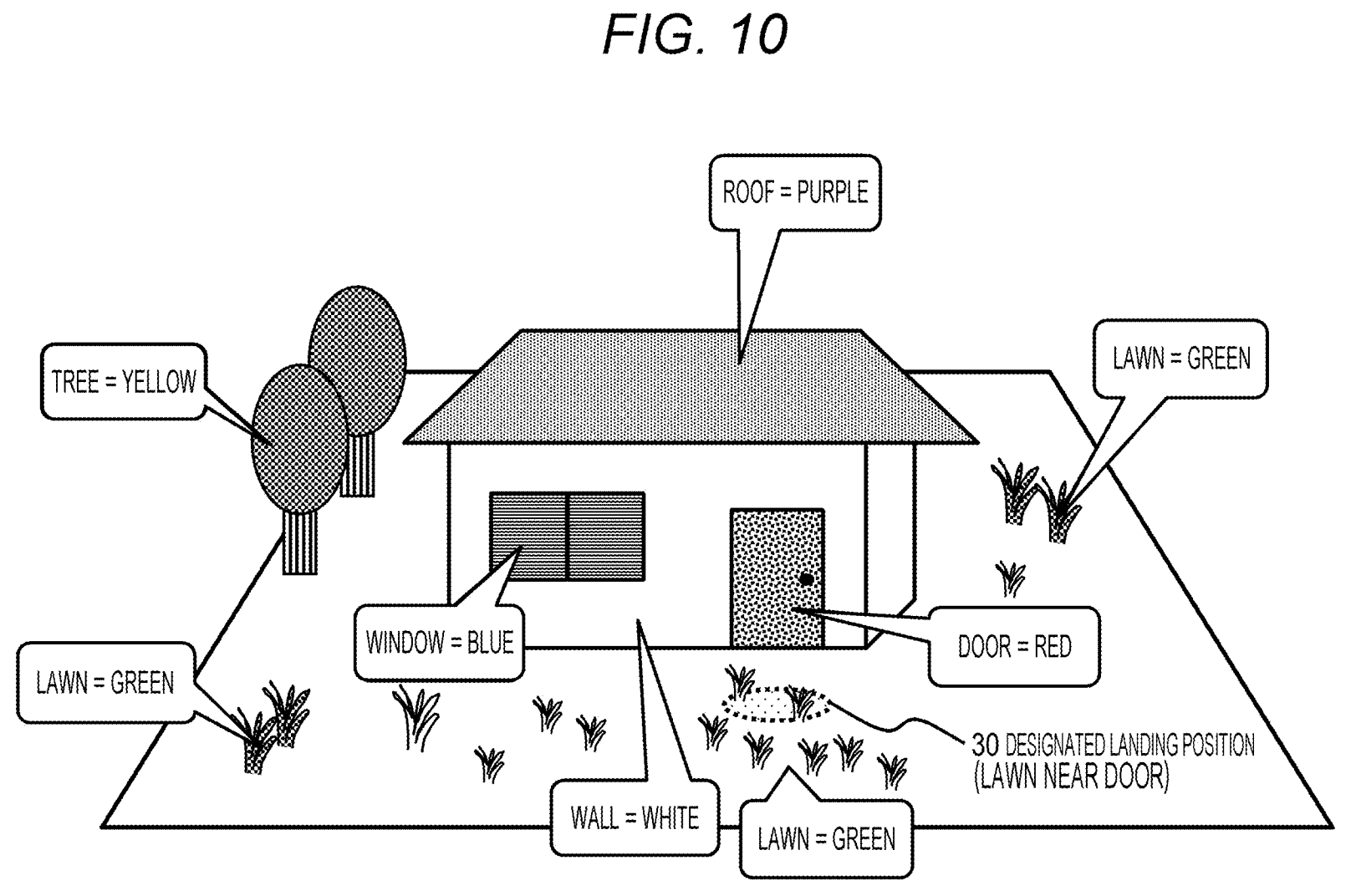

As a result, for example, as illustrated in FIG. 10, it is possible to acquire the object analysis image in which colors corresponding to various types of objects included in the captured image are output.

In the example illustrated in FIG. 10, for object type=roof, output color=purple, for object type=window, output color=blue, for object type=wall, output color=white, for object type=door, output color=red, for object type=tree, output color=yellow, and for object type=lawn, output color=green.

FIG. 10 illustrates an example in which colors corresponding to these object types are output.

By the semantic segmentation processing, it is possible to output an image in which such output colors corresponding to the object types are set. That is, object types of various subjects included in the image can be determined by the semantic segmentation processing.

Figure 11:
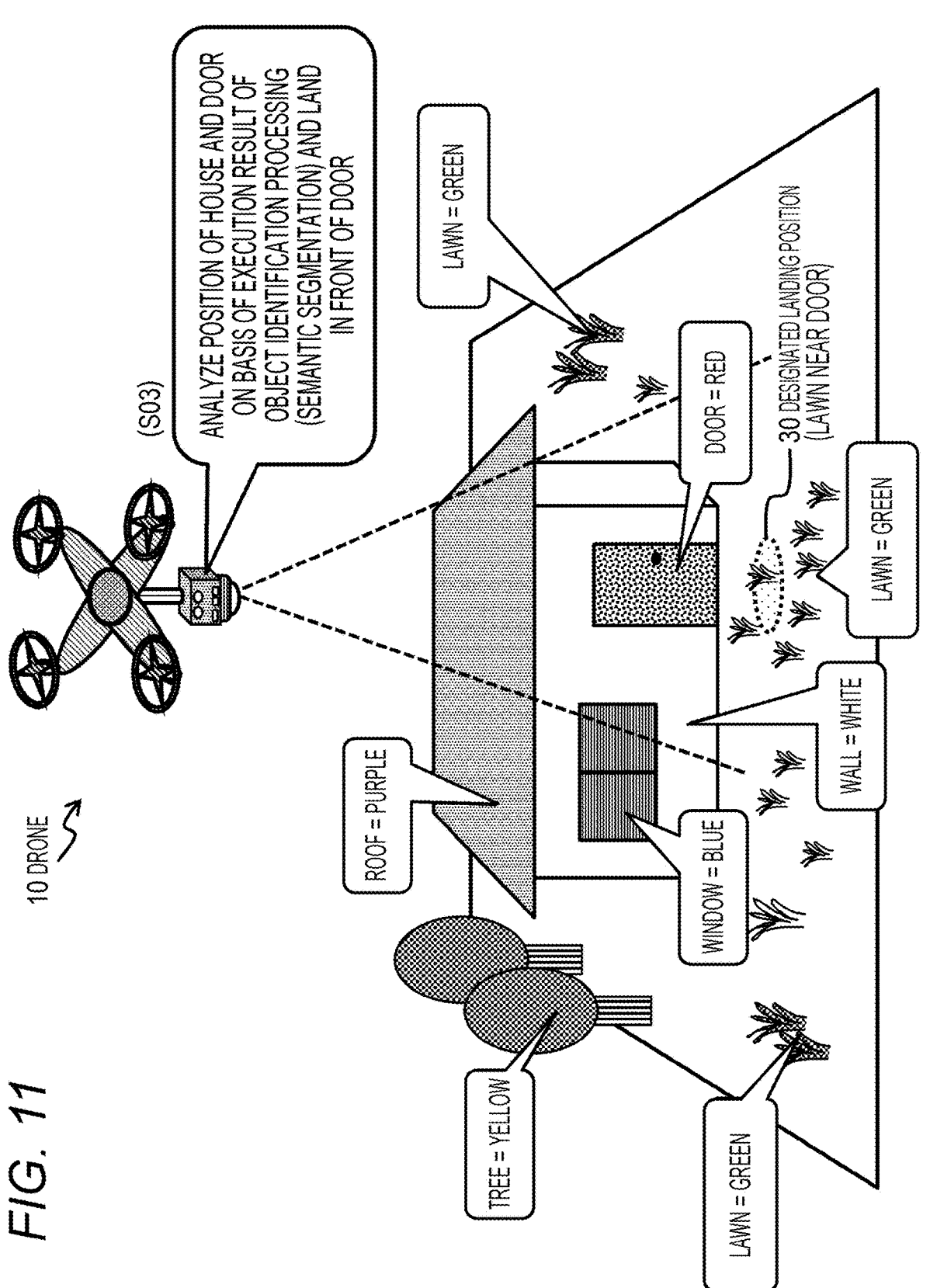
FIG. 11 is a diagram for explaining a specific example of flight processing and landing processing of a drone to which the processing of the present disclosure is applied.

After the object identification processing, the drone 10 executes the processing of step S03 illustrated in FIG. 11.

That is, the drone 10 analyzes the position of the door and the position of the lawn on the basis of the execution result of semantic segmentation performed as the object identification processing as illustrated in FIG. 11, and can accurately land on the position of the lawn near the door where the user has designated the position.

The drone 10 determines the position (lawn near the door) corresponding to sentence indicating designated landing position="lawn near door"

transmitted from the user terminal 60, as the target landing position on the basis of the execution result of the object identification processing (semantic segmentation).

As a result, substantially the same position as the designated landing position 30 desired by the user 50 as the drone landing position is determined as the target landing position, and the drone can land at the position.

Note that the drone 10 or the drone management server 70 analyzes which position in the camera-imaged image of the drone 10 corresponds to the position specified by sentence indicating designated landing position="lawn near door", which is transmission data from the user terminal 60.

In this processing, the drone 10 or the drone management server 70 performs morphological analysis processing, semantic analysis processing, or the like of sentence indicating designated landing position="lawn near door", which is the transmission data from the user terminal 60, to analyze which location in the image corresponds to the location designated by the sentence.

In a case where the morphological analysis processing of the sentence is performed, a part of speech analysis of a noun, a particle, or the like included in the sentence in units of morphemes constituting the sentence is performed, and an object indicated by a noun, a connection relationship between nouns, and the like are further analyzed to determine a position designated by the sentence.

The drone 10 or the drone management server 70 further analyzes which position of the image captured by the camera of the drone 10 the position determined by the analysis processing of the sentence corresponds to, on the basis of the execution result of the object identification processing (semantic segmentation).

The drone 10 performs landing by setting a position specified on the basis of the analysis result as a target landing position.

A specific example of the morphological analysis processing executed by the drone 10 or the drone management server 70 will be described with reference to FIGS. 12 and 13.

Figure 12:
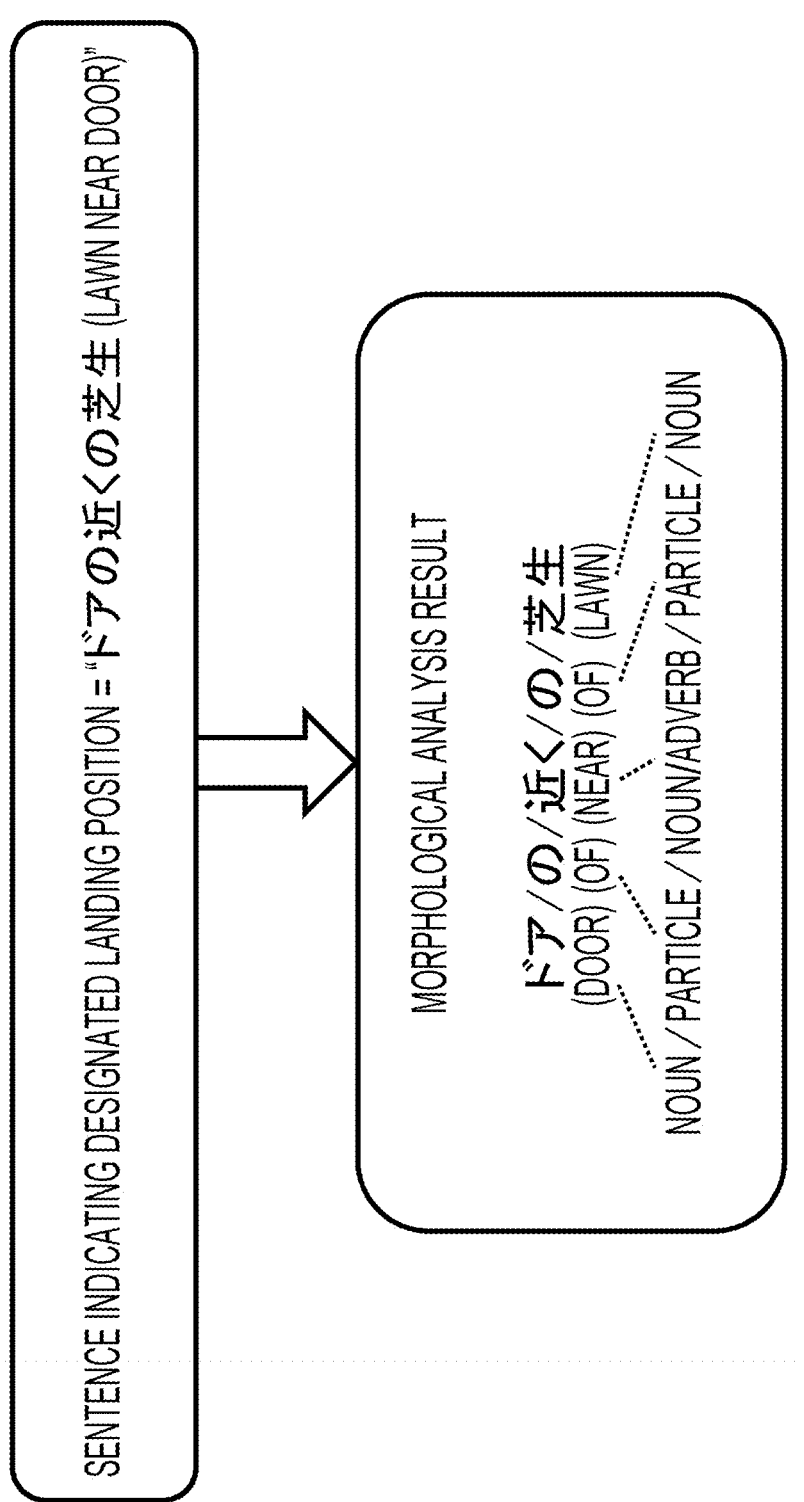
FIG. 12 is a diagram for explaining a specific example of morphological analysis processing of a sentence indicating a designated landing position generated by a user.

As illustrated in FIG. 12, it is assumed that a sentence indicating the designated landing position included in the transmission data from the user terminal 60 is the following sentence.

Sentence indicating designated landing position="lawn near door"

The drone 10 or the drone management server 70 first separates sentence indicating designated landing position="lawn near door"

into morphemes which are sentence constituent elements, and performs a part of speech analysis in morphological units constituting a part of speech (nouns, particles, and the like) sentence of each morpheme.

As illustrated in FIG. 12, the part of speech in morphological units of "ドアの近くの芝生 (lawn near door)" is analyzed as follows.

ドア (door)=noun
   の (of)=particle
   近く (near)=noun/adverb
   の (Off)=particle
   芝生 (lawn)=noun Note that "近く (near)" means that there are two settings of noun and adverb.

Furthermore, the drone 10 or the drone management server 70 performs detailed analysis of each morpheme using the dictionary for morphological analysis.

FIG. 13 is a diagram illustrating an example of a detailed analysis processing result of the morphological analysis.

FIG. 13 illustrates the results of the analysis of each of these data in morphological units: (a) usage dictionary, (b) sentence boundary labels, (c) written form (surface form), (d) lexical elements, (f) lexical element reading, (g) major classification, (h) medium classification, and (i) minor classification.

For example, (b) sentence boundary labels are labels in which B is set to the morpheme of the beginning of the sentence, and I is set to the morpheme that is not the beginning of the sentence.

Note that the morphological analysis result illustrated in FIG. 13 is merely an example, and acquiring all of these data is not essential to the processing of the present disclosure.

A process required in the process of the present disclosure is a process of obtaining information for enabling determination of the position designated by the sentence transmitted by the user terminal 60, and for this purpose, is a process of performing a part of speech analysis of nouns, particles, and the like included in the sentence in units of morphemes constituting the sentence, analyzing an object indicated by a noun, a connection relationship between nouns, and the like, and acquiring data enabling determination of the position designated by the sentence.

A specific example of a process of determining which position in the real space the designated position of the sentence determined by the morphological analysis processing of the sentence corresponds to will be described with reference to FIG. 14 and subsequent drawings.

The process of determining which position in the real space the designated position of the sentence determined by the morphological analysis processing of the sentence corresponds to is executed on the basis of the result of the object identification processing (semantic segmentation) based on the captured image of the camera of the drone 10.

Figure 14:
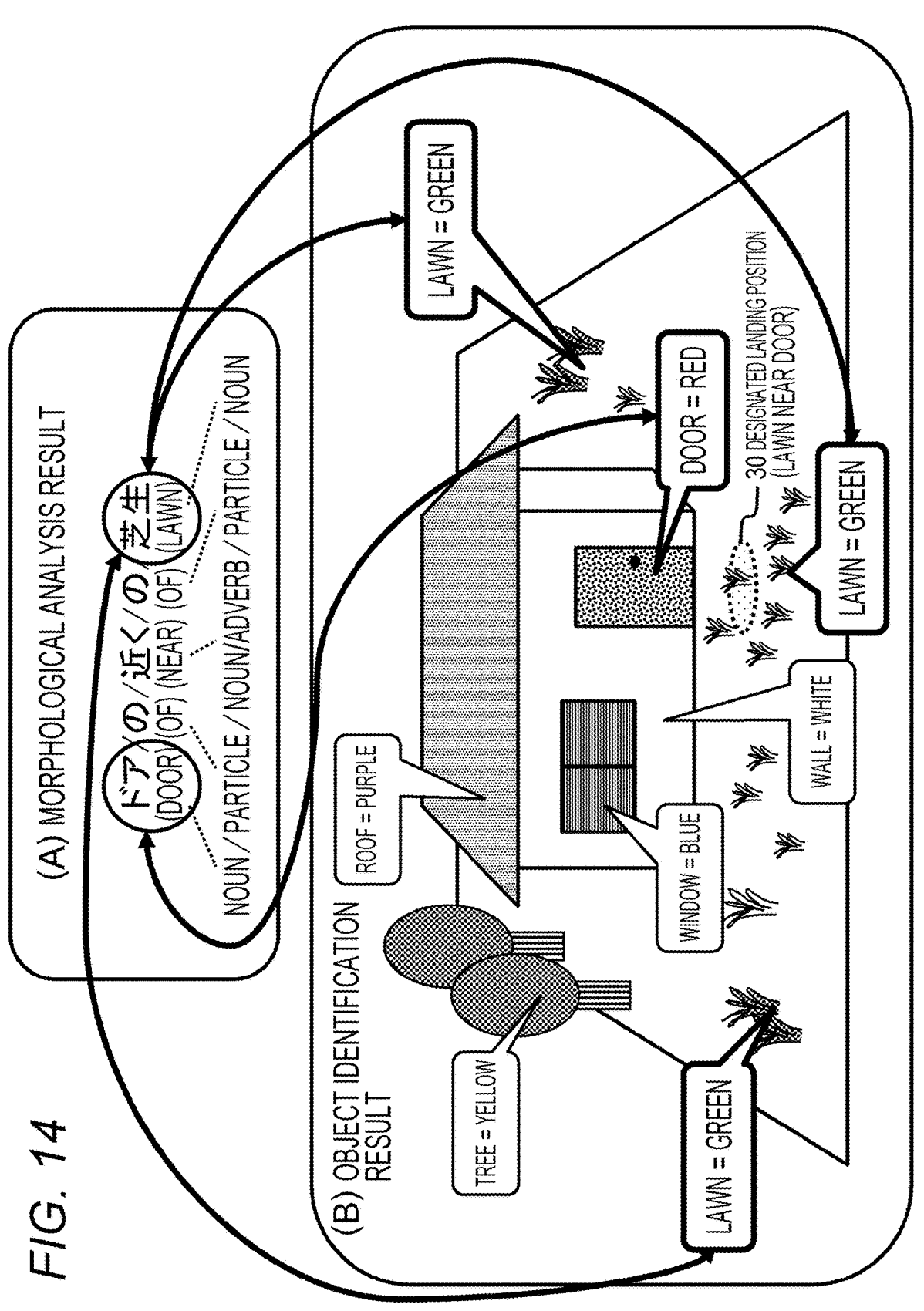
FIG. 14 is a diagram for explaining a specific example of a process of determining a position in the real space to which the designated position of the sentence determined by the morphological analysis processing of the sentence indicating the designated landing position generated by the user corresponds.

FIG. 14 illustrates the following two pieces of data.

(A) Morphological analysis result (B) Object identification (semantic segmentation) result First, the drone 10 or the drone management server 70 selects morphemes whose part of speech is a noun from the morphological analysis result of the sentence indicating the designated landing position received from the user terminal 60, that is, sentence indicating designated landing position="lawn near door".

As described above, the parts of speech of the morphemes included in sentence indicating designated landing position=
"ドアの近くの芝生 (lawn near door)"

are as follows.

ドア (door)=noun
の (of)=particle
近く (near)=noun/adverb
の (of)=particle
芝生 (lawn)=noun That is, there are three nouns: "ドア (door)", "近く (near)", and "芝生 (lawn)".

The drone 10 or the drone management server 70 determines whether or not the objects corresponding to the nouns included in the sentence are included in the objects extracted as a result of (B) object identification (semantic segmentation) result.

As illustrated in the object identification (semantic segmentation) result in FIG. 14(B), the object identification result is as follows.

Roof (output color=purple)
Window (output color=blue)
Wall (output color=white)
Door (output color=red)
Tree (output color=yellow)
Lawn (output color=green)

From the object identification result, the drone 10 or the drone management server 70 can detect two objects of door (output color=red) and
lawn (output color=green),
as objects corresponding to nouns included in sentence="lawn near door".

The drone 10 or the drone management server 70 confirms the positions of the two noun corresponding objects included in the sentence detected from the object identification result, that is, door (output color=red) and
lawn (output color=green),
and then further analyzes the positions in the real space indicated by
sentence indicating designated landing position="lawn near door".

Figure 15:
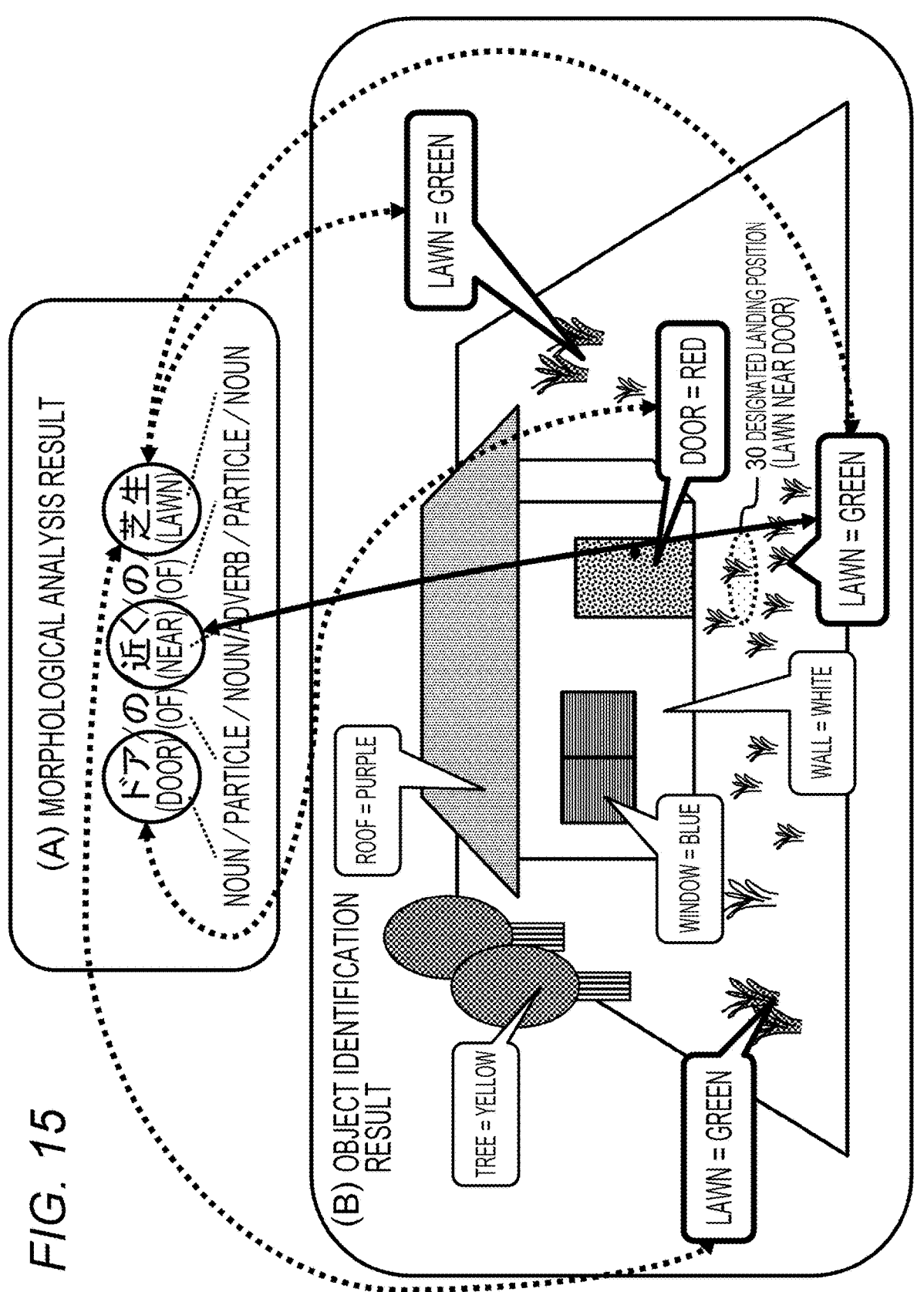
FIG. 15 is a diagram for explaining a specific example of a process of determining a position in the real space to which the designated position of the sentence determined by the morphological analysis processing of the sentence indicating the designated landing position generated by the user corresponds.

A specific processing example is illustrated in FIG. 15.

As illustrated in FIG. 15, the drone 10 or the drone management server 70 analyzes the meaning of the morphemes included in the morphological analysis result of the sentence indicating the designated landing position received from the user terminal 60, that is, sentence indicating designated landing position="lawn near door",
analyzes the morphemes that indicate the relationship between these two objects of
door (output color=red) and
lawn (output color=green),
that is, the meaning of
morpheme=near,
and other morphemes such as adverbs and other conjunctive relations to determine the position of the lawn near the door in the three-dimensional space.

As illustrated in FIG. 15, the lawn spreads around the house, but the drone 10 or the drone management server 70 selects the area of the lawn near the door on the basis of the sentence indicating the designated landing position received from the user terminal 60.

Figure 16:
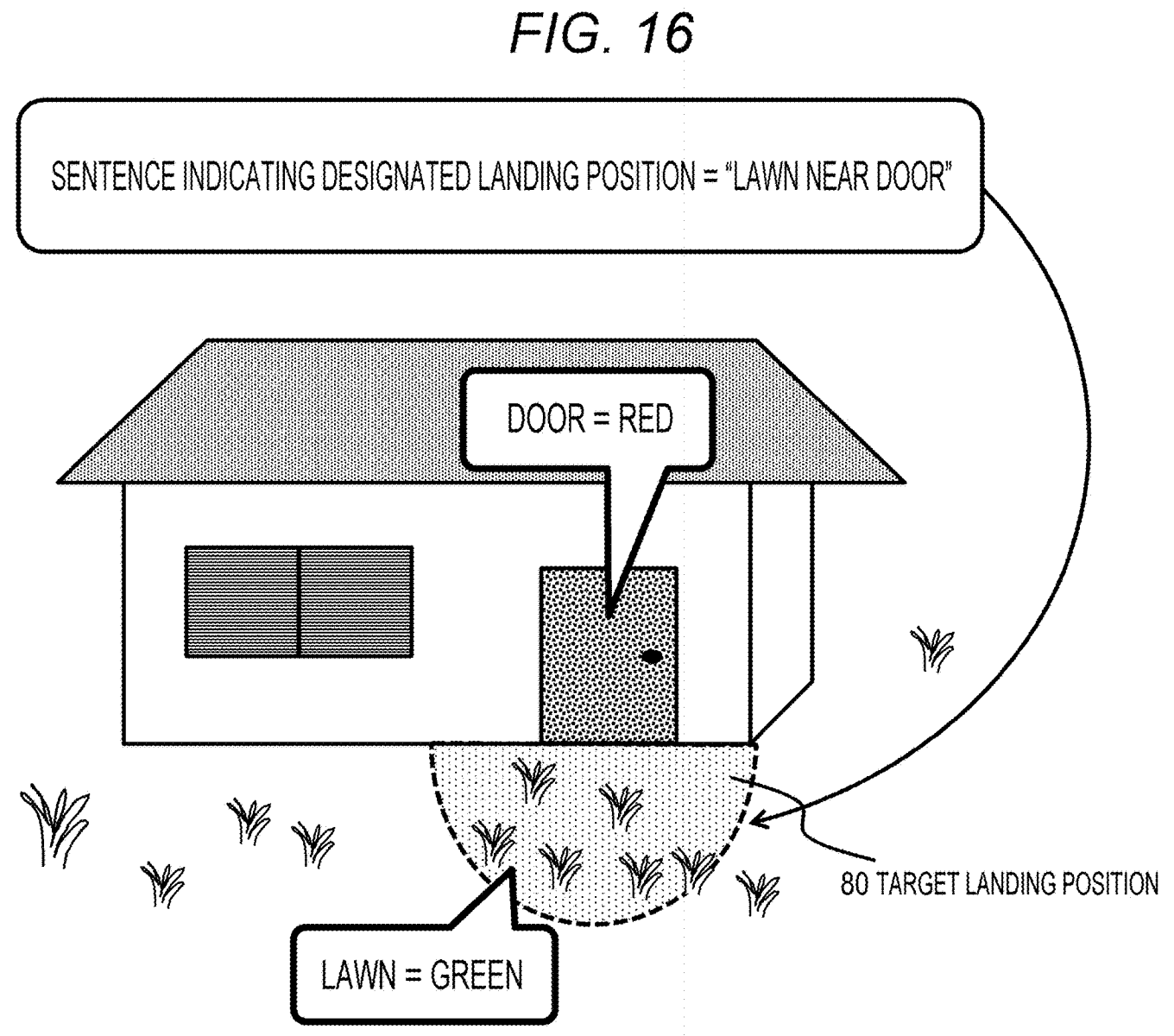

Furthermore, as illustrated in FIG. 16, the drone 10 or the drone management server 70 determines an area of the lawn near the door as the target landing position of the drone 10.

Such a process determines the target landing position 80 illustrated in FIG. 16.

FIG. 17 illustrates two positions:

the target landing position 80 determined by the drone 10 or the drone management server 70 by morphological analysis and semantic analysis based on the
sentence indicating the designated landing position transmitted from the user terminal 60, that is, sentence indicating designated landing position="lawn near door",
as well as object identification processing (semantic segmentation), and
the designated landing position 30 set in advance by the user.

As illustrated in FIG. 17, the target landing position 80 determined by the drone 10 or the drone management server 70 on the basis of the sentence indicating the designated landing position transmitted from the user terminal 60 is substantially the same position as the designated landing position 30 set in advance by the user.

By landing toward the target landing position 80, the drone 10 can land at substantially the same position as the designated landing position 30 set in advance by the user.

3. Processing Example in Case where it is Difficult to Specify Identification Object by Object Identification Processing (Semantic Segmentation) from Sentence Indicating Designated Landing Position Generated by User Next, a processing example in a case where it is difficult to specify the identification object by the object identification processing (semantic segmentation) from the sentence indicating the designated landing position generated by the user will be described.

As described above, the semantic segmentation executed by the drone 10 or the drone management server 70 as the object identification processing is a technology of identifying which object category each of constituent pixels (pixels) of an image belongs to, on the basis of a matching degree between object identification dictionary data (learned data) in which shape information and other feature information of various actual objects are registered and an object in a camera-imaged image.

With this semantic segmentation, it is possible to identify various objects included in the camera-imaged image, for example, types of objects such as a person, a car, a building, a road, a tree, a pond, and lawn.

As described above, semantic segmentation performs processing of specifying object types of various subjects included in a captured image by using object identification dictionary data (learned data) in which shape information and other feature information of actual objects are registered. Therefore, in a case where a shape and a feature of a subject in a captured image to be subjected to object identification are not registered in the object identification dictionary data (learned data), there is a case where object identification cannot be performed for the subject.

In such a case, there is a possibility that the target landing position cannot be determined on the basis of the sentence indicating the designated landing position generated by the user only by applying the above-described embodiment.

Processing for reducing such a possibility will be described.

Figure 18:
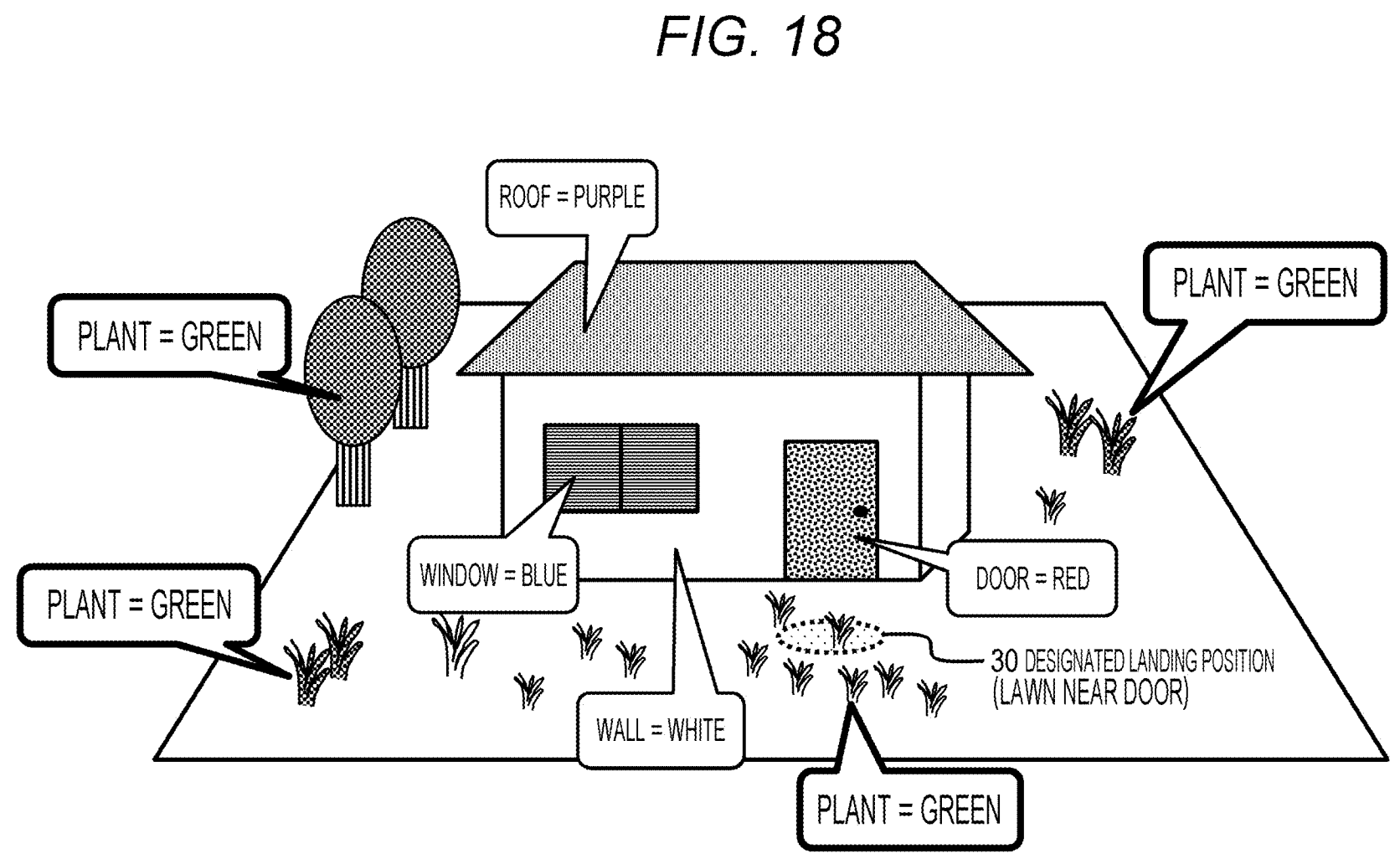

FIG. 18 is a diagram illustrating a result of object identification (semantic segmentation) processing executed using a certain piece of object identification dictionary data (learned data).

The result of the object identification (semantic segmentation) processing illustrated in FIG. 18 is data identifying the following plurality of objects.

Object=roof (output color=purple)
Object=window (output color=blue)
Object=wall (output color=white)
Object=door (output color=red)
Object=plant (output color=green)

The colors corresponding to the identified objects are the output image.

This object identification result is a result of execution using one piece of object identification dictionary data (learned data), and means that feature information and shape information of the identified object, that is, each of the roof, the window, the wall, the door, and the plant are registered in the object identification dictionary data (learned data).

However, the object identification result illustrated in FIG. 18 is different from the object identification result described with reference to FIG. 10 in the above embodiment.

The object identification result described above with reference to FIG. 10 includes the following identification objects.

Object=roof (output color=purple)
Object=window (output color=blue)
Object=wall (output color=white)
Object=door (output color=red)
Object=tree (Output Color=yellow)
Object=lawn (output color=green)

That is, the following two types of objects in the object identification result described above with reference to FIG. 10, that is, object=tree (output color=yellow) and
object=lawn (output color=green),
are set to the following one type of object, that is,
object=plant (output color=green),
in the object identification result illustrated in FIG. 18.

This is because the dictionary data (learned data) used for the object identification processing, that is, the semantic segmentation described with reference to FIG. 10 registers the feature information and the shape information as the objects in which the tree and the lawn are different from each other, but the dictionary data (learned data) used for the object identification processing (semantic segmentation) illustrated in FIG. 18 does not register the feature information and the shape information as the objects in which the tree and the lawn are different from each other, and the feature information and the shape information are registered as the plants.

As described above, in the semantic segmentation processing, different object identification results are output according to the registration data of the dictionary data (learned data) used for the processing.

In a case where the above-described embodiment is applied using the object identification result illustrated in FIG. 18, the target landing position cannot be determined on the basis of the sentence indicating the designated landing position generated by the user.

A specific example will be described with reference to FIG. 19.

Figure 19:
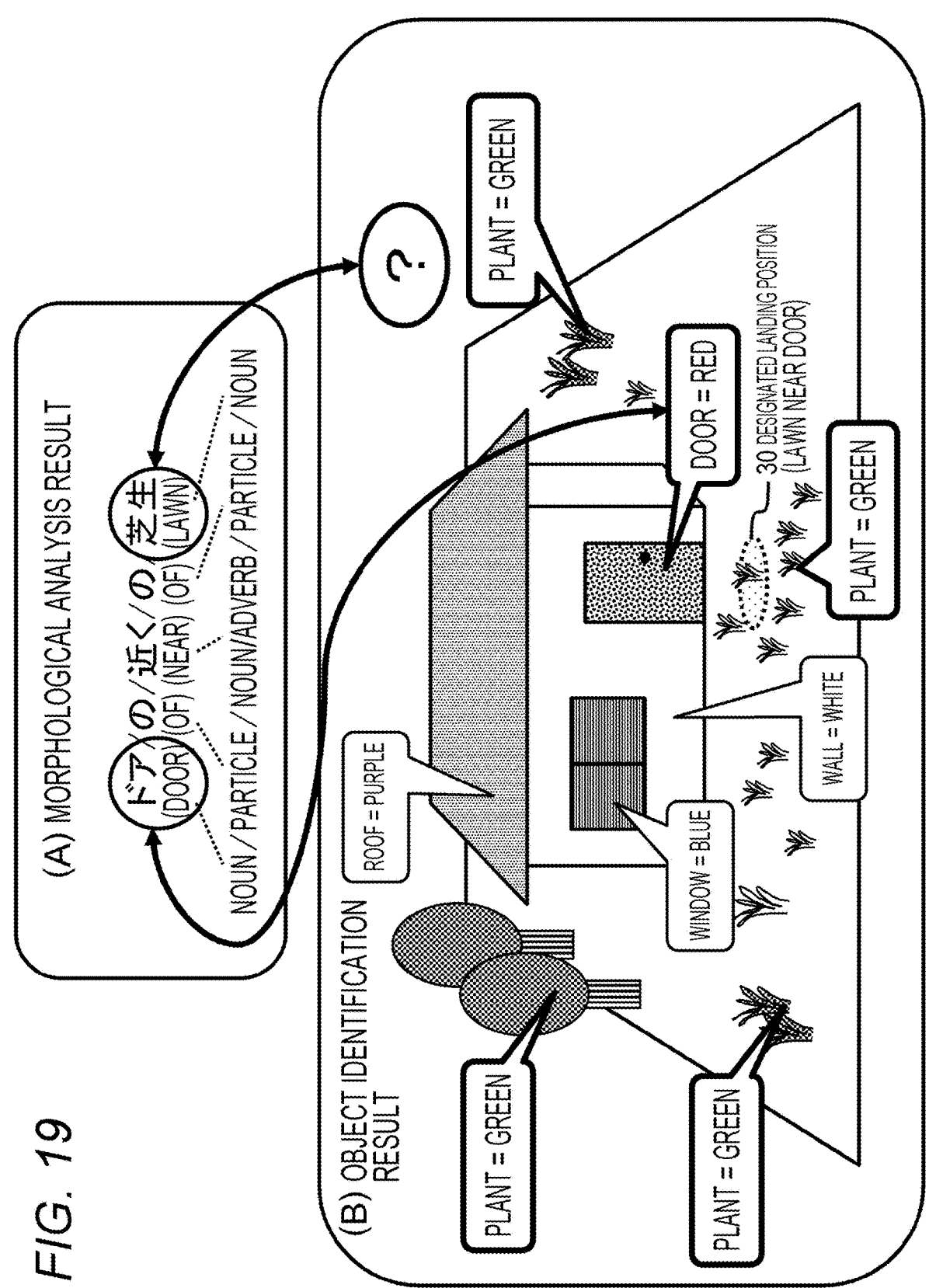
FIG. 19 is a diagram illustrating a result of object identification (semantic segmentation) processing executed using a certain piece of object identification dictionary data (learned data).

FIG. 19 illustrates the following two pieces of data.

(A) Morphological analysis result
(B) Object identification (semantic segmentation) result First, the drone 10 or the drone management server 70 selects morphemes whose part of speech is a noun from the morphological analysis result of the sentence indicating the designated landing position received from the user terminal 60, that is, sentence indicating designated landing position="lawn near door".

As described above, the parts of speech of the morphemes included in sentence indicating designated landing position="ドアの近くの芝生 (lawn near door)"
are as follows.

ドア (door)=noun
の(of)=particle
近く (near)=noun/adverb
の (of)=particle
芝生 (lawn)=noun That is, there are three nouns: "ドア (door)", "近く (near)", and "芝生 (lawn)".

The drone 10 or the drone management server 70 determines whether or not the objects corresponding to the nouns included in the sentence are included in the objects extracted as a result of (B) object identification (semantic segmentation) result.

As illustrated in the object identification (semantic segmentation) result in FIG. 19(B), the object identification result is as follows.

Roof (output color=purple)
Window (output color=blue)
Wall (output color=white)
Door (output color=red)
Plant (output color=green)

From the object identification result, the drone 10 or the drone management server 70 can detect one object, door (output color=red),
as an object corresponding to a noun included in sentence="lawn near door".

However, since "lawn" included in the sentence is not included in the object identification result illustrated in FIG. 19(B), it is impossible to detect "lawn" from the object identification result illustrated in FIG. 19(B).

In such a case, a similar word dictionary in which similar data of words is registered is used.

The drone 10 or the drone management server 70 stores a similar word dictionary in the storage unit, and searches for a word similar to the word included in the sentence indicating the designated landing position="lawn near door" generated by the user with reference to the dictionary.

There are various types of similar word dictionaries, and as an example of a representative similar word dictionary, there is a Word2Vec dictionary.

The Word2Vec dictionary is a dictionary that enables retrieval of a word having high similarity for each word on the basis of the meaning of the word. It is a dictionary in which a large number of words are vector-connected by setting a vector according to closeness of meaning between words.

Figure 20:
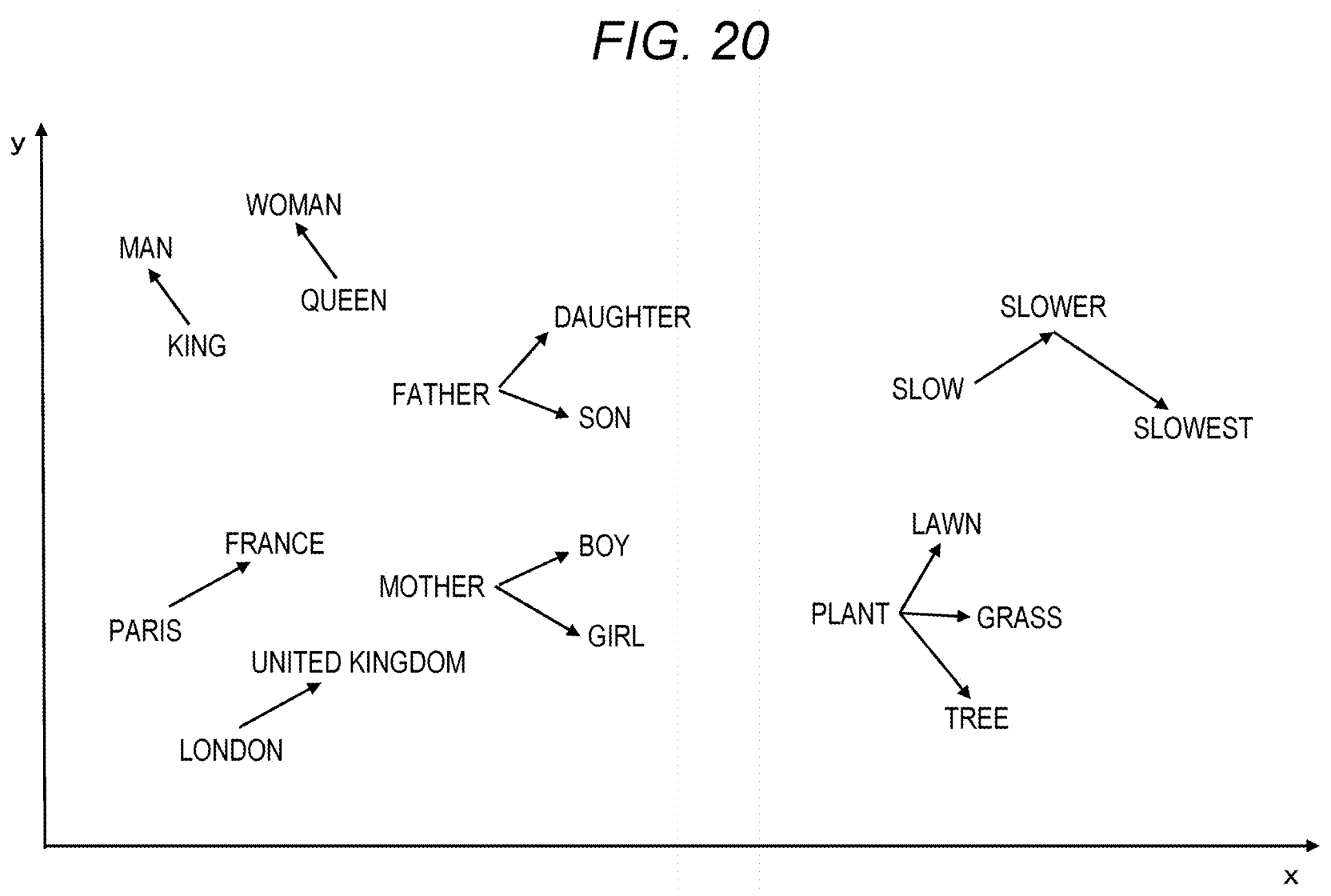

FIG. 20 illustrates an example of registration data of a Word2Vec dictionary.

As illustrated in FIG. 20, a Word2Vec dictionary has a configuration in which, for example, a large number of words are expanded on an xy two-dimensional plane, and words are connected by vectors according to similarity of each word.

For example, "lawn", "grass", and "tree" are registered as words similar to the word "plant" in the lower right.

The drone 10 or the drone management server 70 performs processing with reference to such a similar word dictionary.

That is, a similar word is selected from the similar word dictionary for the noun words in the sentence indicating the designated landing position generated by the user, sentence indicating designated landing position="lawn near door", that are not included in the object identification result.

The similar word to be selected is a word indicating an object included in the object identification result.

A specific processing example will be described with reference to FIG. 21.

Figure 21:
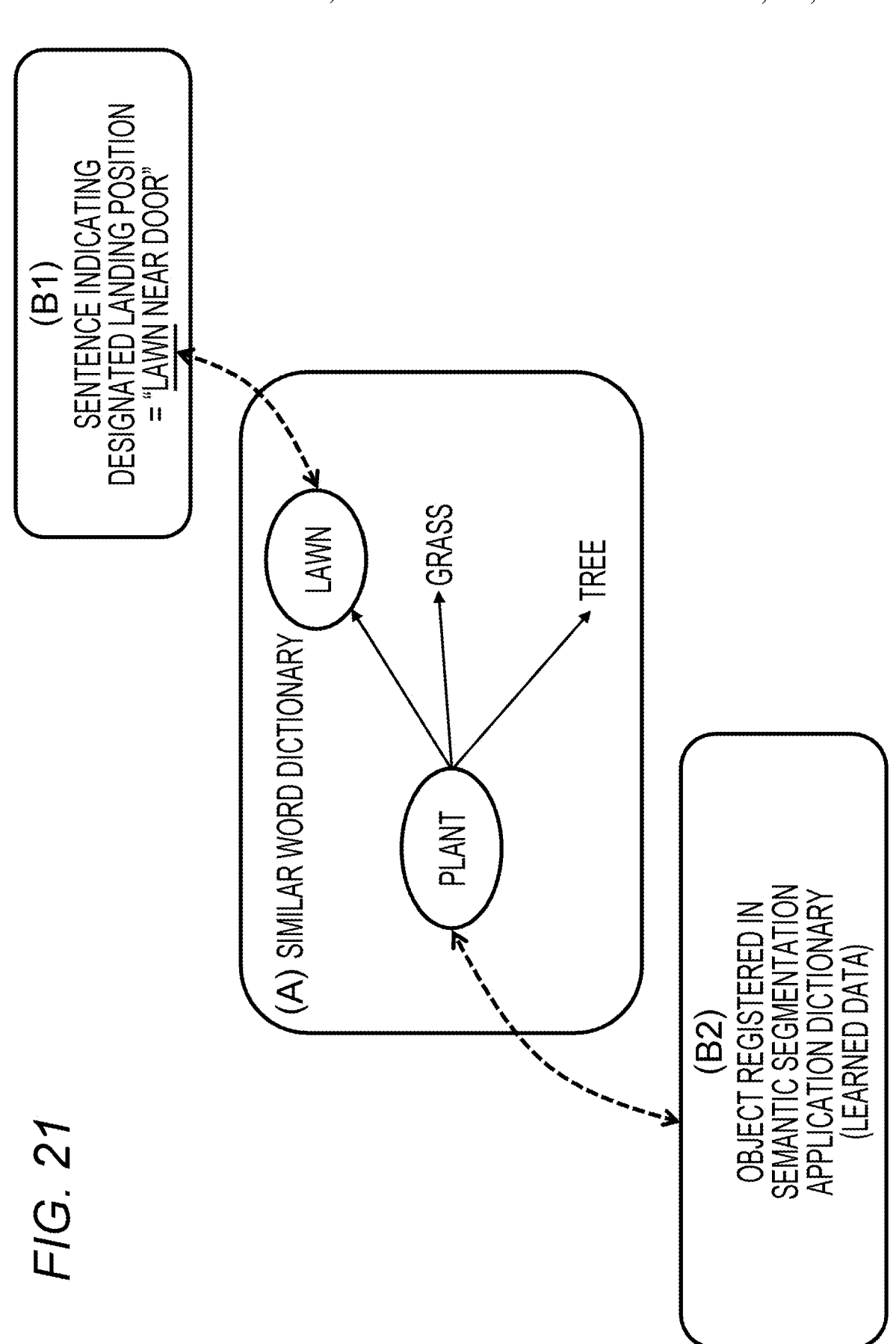
FIG. 21 is a diagram for explaining an example of similar word search processing using a similar word dictionary.

FIG. 21 illustrates each data of:

(A) similar word dictionary;

(B1) sentence indicating designated landing position="lawn near door"; and (B2) object registered in semantic segmentation application dictionary (learned data).

The drone 10 or the drone management server 70 selects "lawn"

as a word that is not included in the object identification result among the noun words in the sentence indicating the designated landing position generated by the user, that is, sentence indicating designated landing position="lawn near door", and selects a similar word from the similar word dictionary for "lawn".

The similar word to be selected is a word indicating an object included in the object identification result.

As illustrated in the drawing, as a word that is similar to "lawn" and indicates an object included in the object identification result, "plant"

can be selected.

The drone 10 or the drone management server 70 uses the word selected by applying the similar word dictionary in this manner to execute processing of obtaining an intended position of the sentence indicating the designated landing position received from the user terminal 60, that is, sentence indicating designated landing position="lawn near door"

in a three-dimensional space from a result of object identification (semantic segmentation).

A specific processing example will be described with reference to FIG. 22.

Figure 22:
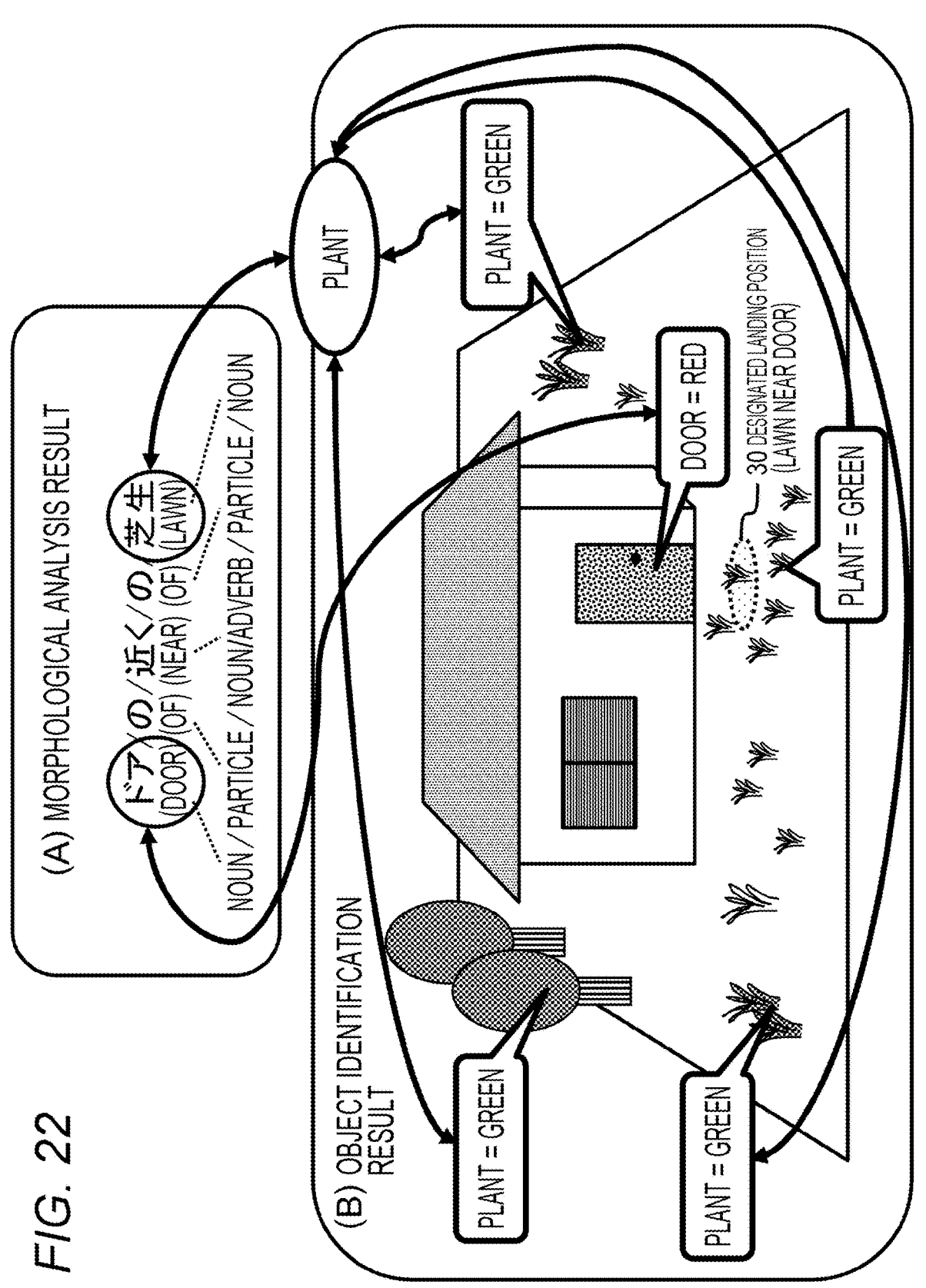
FIG. 22 is a diagram for explaining a specific example of a process of determining a position in a real space to which a designated position of a sentence corresponds by using a similar word dictionary for a morphological analysis result of the sentence indicating a designated landing position.

FIG. 22 illustrates the following two pieces of data.

(A) Morphological analysis result (B) Object identification (semantic segmentation) result First, the drone 10 or the drone management server 70 selects morphemes whose part of speech is a noun from the morphological analysis result of the sentence indicating the designated landing position received from the user terminal 60, that is, sentence indicating designated landing position="lawn near door".

As described above, the parts of speech of the morphemes included in sentence indicating designated landing position= "ドアの近くの芝生 (lawn near door)"

are as follows.

ドア (door)=noun

の (of)=particle

近く (near)=noun/adverb

の(of)=particle

芝生 (lawn)=noun

That is, there are three nouns: "ドア (door)", "近く (near)", and "芝生 (lawn)".

The drone 10 or the drone management server 70 determines whether or not the objects corresponding to the nouns included in the sentence are included in the objects extracted as a result of (B) object identification (semantic segmentation) result.

As illustrated in the object identification (semantic segmentation) result in FIG. 22(B), only the door (output color=red) is detected from the object identification result.

"Near" and "lawn" are not detected from the object identification result.

The drone 10 or the drone management server 70 selects a similar word from the similar word dictionary for the noun-corresponding words "near" and "lawn" not included in the object identification result among the noun words included in sentence indicating designated landing position="lawn near door".

The similar word to be selected is a word indicating an object included in the object identification result.

As described above with reference to FIG. 21, in the similar word selection processing from the similar word dictionary, the drone 10 or the drone management server 70 selects a word similar to "lawn" and indicating an object included in the object identification result, "plant".

The drone 10 or the drone management server 70 uses the word "plant" selected by applying the similar word dictionary in this manner to execute processing of obtaining an intended position of the sentence indicating the designated landing position received from the user terminal 60, that is, sentence indicating designated landing position="lawn near door"

in a three-dimensional space from a result of object identification (semantic segmentation).

That is, as illustrated in FIG. 22,

"lawn" in the sentence indicating the designated landing position received from the user terminal 60, that is, sentence indicating designated landing position="lawn near door"

is determined to be an object matching "plant", and from "(B) object identification result" illustrated in FIG. 22, sentence="lawn near door"

is interpreted as

"plant near door", and two objects of door (output color=red), and plant (output color=green)

are detected as objects corresponding to nouns included in this interpreted sentence.

The drone 10 or the drone management server 70 confirms the positions of the two objects detected from the object identification result, that is, door (output color=red), and plant (output color=green), and then further analyzes the position in the real space indicated by the interpreted sentence of "plant near door"

of sentence indicating designated landing position="lawn near door".

Figure 23:
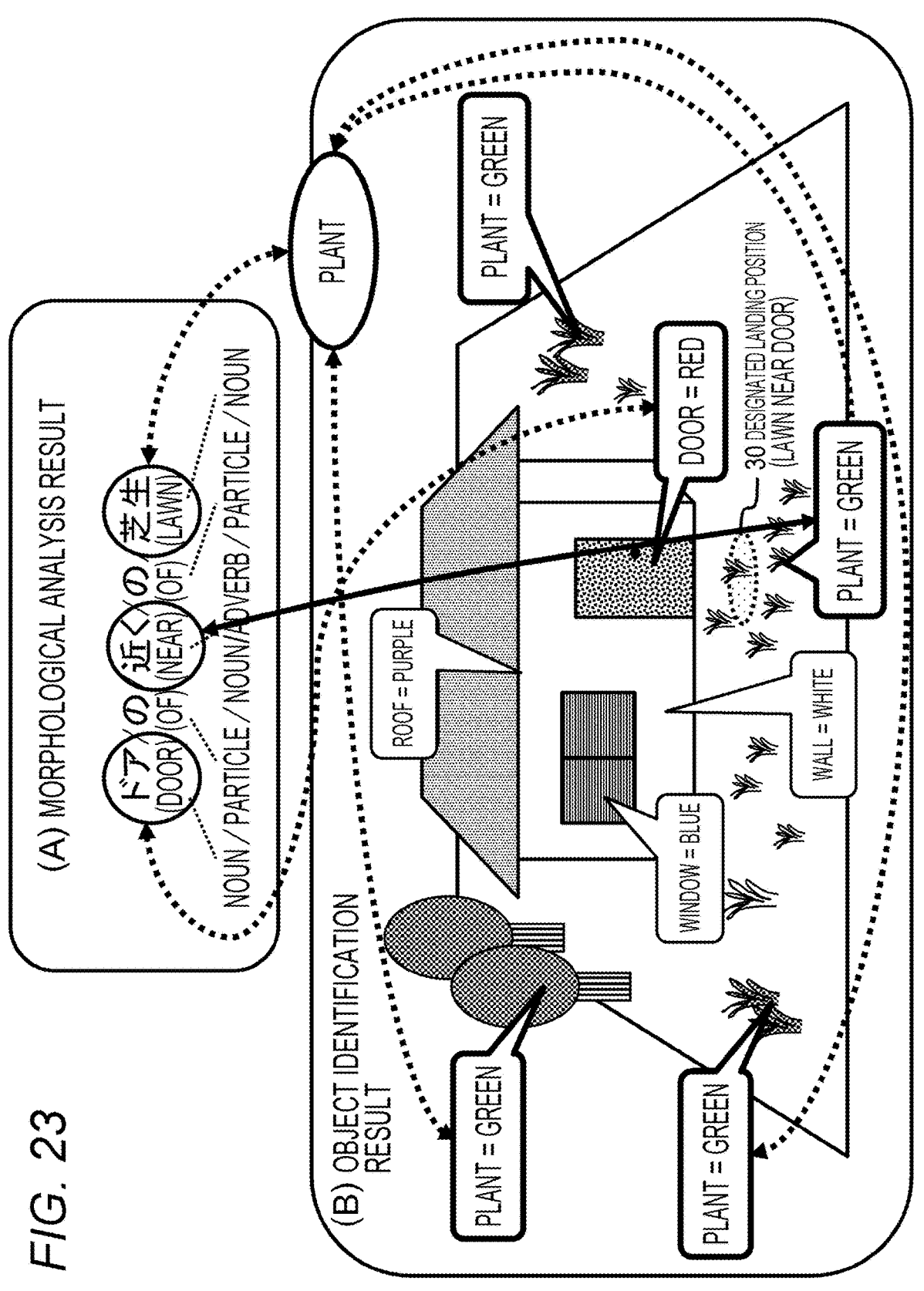
FIG. 23 is a diagram for explaining a specific example of a process of determining a position in a real space to which a designated position of a sentence corresponds by using a similar word dictionary for a morphological analysis result of the sentence indicating a designated landing position.

A specific processing example is illustrated in FIG. 23.

As illustrated in FIG. 23, the drone 10 or the drone management server 70 interprets the sentence indicating the designated landing position received from the user terminal 60, that is, sentence indicating designated landing position="lawn near door"

as

"plant near door", and analyzes the meaning of this interpreted sentence.

Specifically, the morphemes that indicate the relationship between these two objects of door (output color=red), and plant (output color=green), that is, the meaning of morpheme=near, and other morphemes such as adverbs and other conjunctive relations are analyzed to determine the position of the plant near the door in the three-dimensional space.

As illustrated in FIG. 23, a plurality of plants is scattered around the house, but the drone 10 or the drone management server 70 selects an area of a plant (lawn) near the door on the basis of the sentence indicating the designated landing position received from the user terminal 60.

Figure 24:
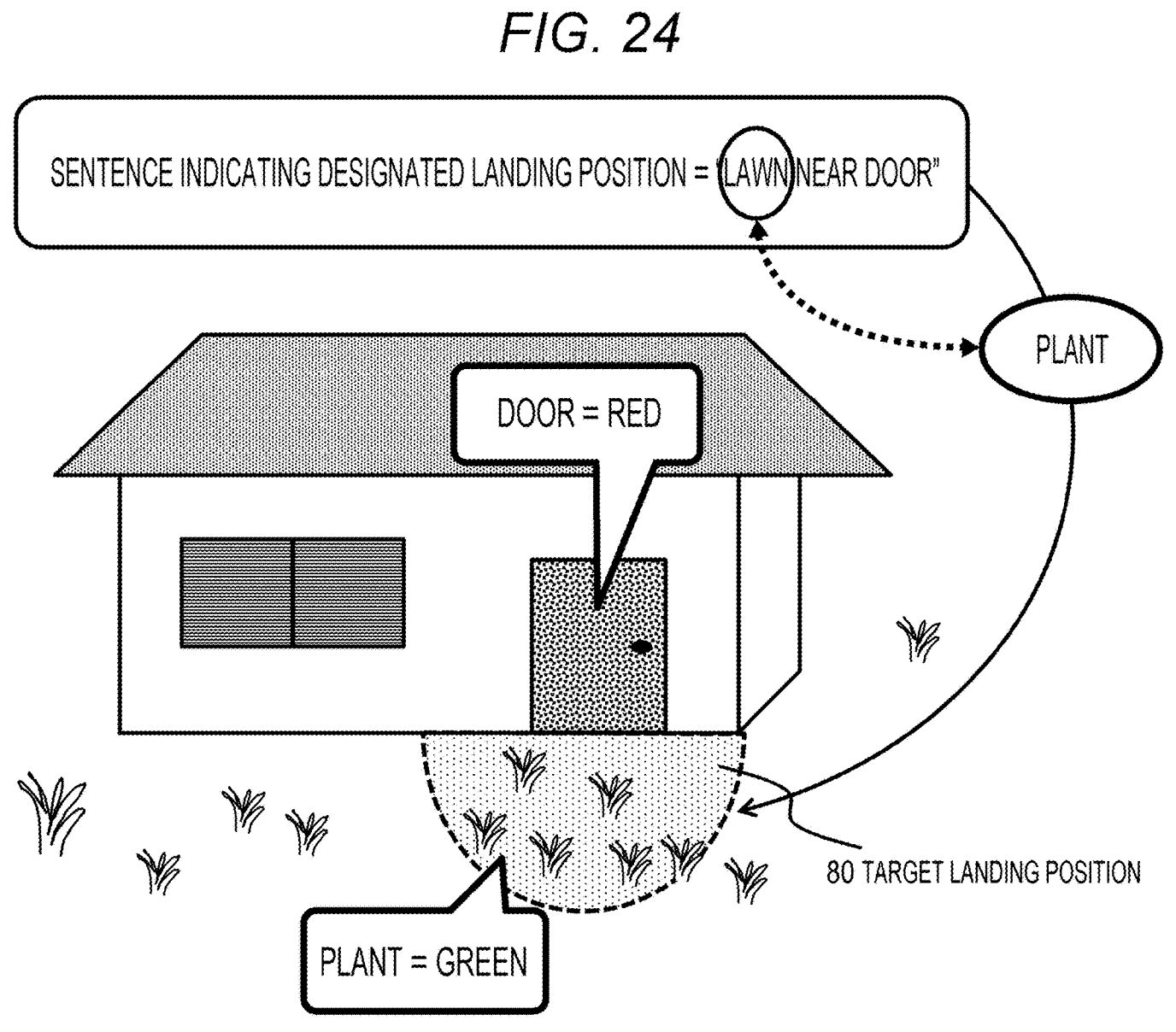

Furthermore, as illustrated in FIG. 24, the drone 10 or the drone management server 70 determines an area of the plant (lawn) near the door as the target landing position of the drone 10.

Such a process determines the target landing position 80 illustrated in FIG. 24.

4. Processing Sequence of Target Landing Position Determination Processing of Drone Executed by Information Processing Apparatus of Present Disclosure Next, a processing sequence of the target landing position determination processing of the drone executed by the information processing apparatus of the present disclosure will be described.

Note that, as described above, the information processing apparatus of the present disclosure that performs the landing position determination processing of the drone is configured in the drone 10 or the drone management server 70 that performs flight management of the drone 10.

The sequence diagrams illustrated in FIG. 25 and subsequent drawings are sequence diagrams for explaining a processing sequence of the present disclosure.

As processing examples of the present disclosure, the following three types of processing examples will be sequentially described.

(Processing Example 1) Processing Example in Which User Terminal Transmission Data Including Designated Landing Position Information (GPS Position or Address) And Sentence Indicating Designated Landing Position Is Transmitted From User Terminal to Drone Management Server, Thereafter, User Terminal Transmission Data Is Transferred From Drone Management Server to Drone, and Drone Determines Flight Path and Landing Position on Basis of User Terminal Transmission Data and Lands (FIGS. 25 to 27)

Figure 30:
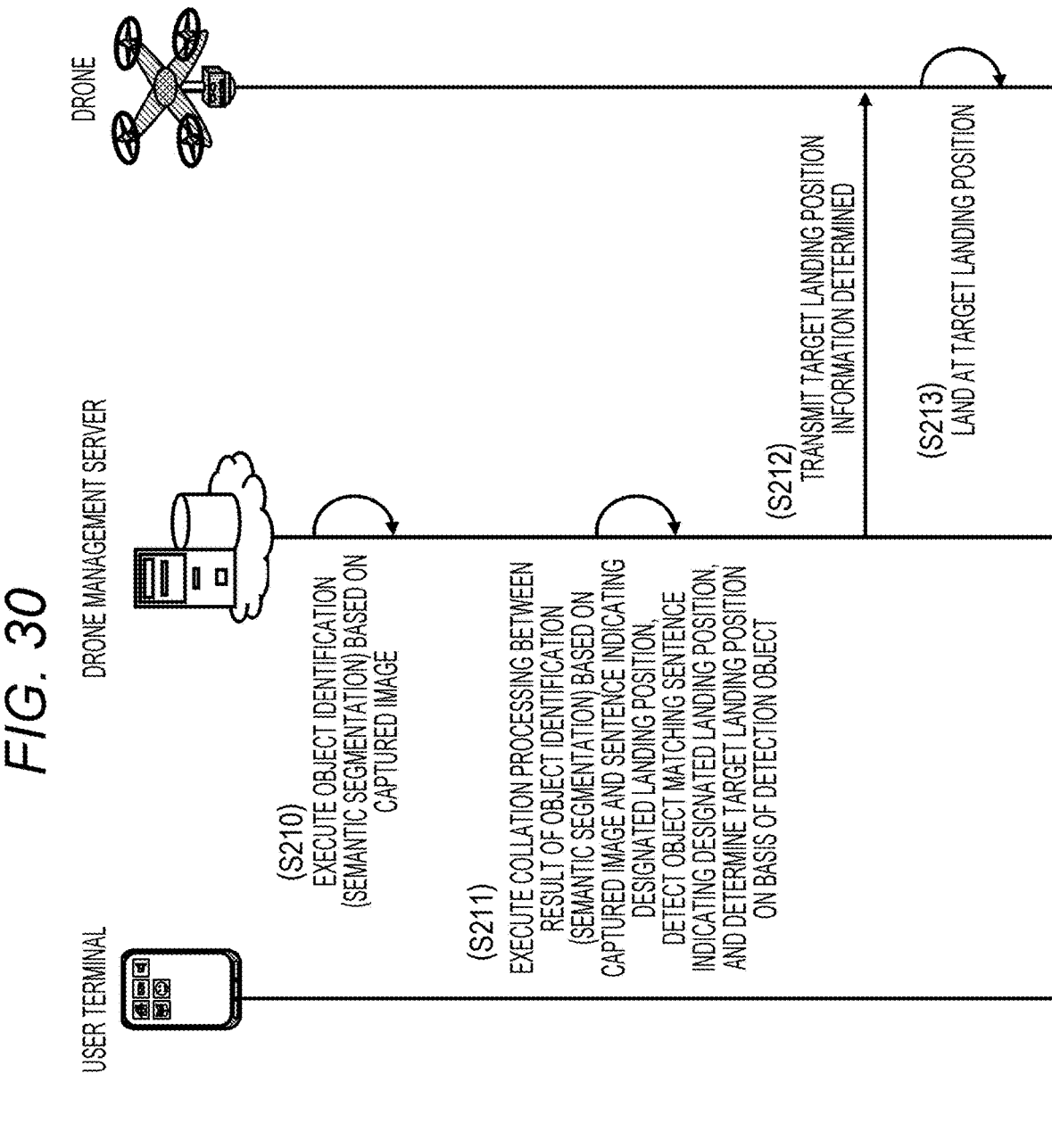
FIG. 30 is a sequence diagram for explaining a processing sequence of target landing position determination processing of the present disclosure.

(Processing Example 2) Processing Example in Which User Terminal Transmission Data Including Designated Landing Position Information (GPS Position or Address) And Sentence Indicating Designated Landing Position Is Transmitted From User Terminal to Drone Management Server, Thereafter, Drone Management Server Determines Flight Path and Landing Position of Drone on Basis of User Terminal Transmission Data, Notifies Drone of Determination Information, and Flies and Lands Drone (FIGS. 28 to 30)

Figure 31:
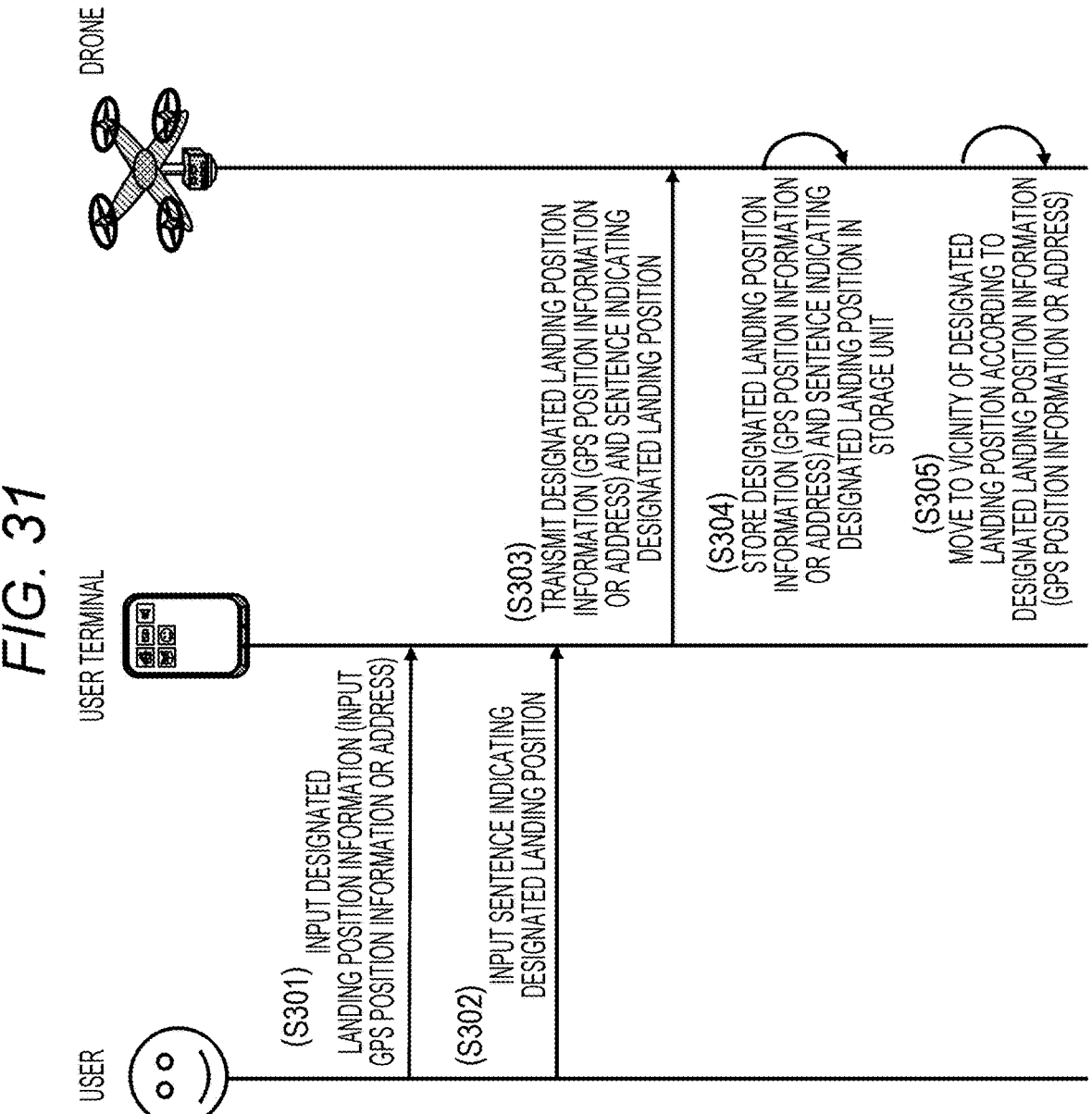
FIG. 31 is a sequence diagram for explaining a processing sequence of target landing position determination processing of the present disclosure.

(Processing Example 3) Processing Example in Which User Terminal Transmission Data Including Designated Landing Position Information (GPS Position or Address) And Sentence Indicating Designated Landing Position Is Transferred From User Terminal to Drone, and Drone Determines Flight Path and Landing Position on Basis of User Terminal Transmission Data and Lands (FIGS. 31 to 32)

4-1. (Processing Example 1) Processing Example in which User Terminal Transmission Data Including Designated Landing Position Information (GPS Position or Address) and Sentence Indicating Designated Landing Position is Transmitted from User Terminal to Drone Management Server, Thereafter, User Terminal Transmission Data is Transferred from Drone Management Server to Drone, and Drone Determines Flight Path and Landing Position on Basis of User Terminal Transmission Data and Lands First, as (Processing Example 1), a processing example will be described in which user terminal transmission data including designated landing position information (GPS position or address) and a sentence indicating the designated landing position is transmitted from the user terminal to the drone management server, and thereafter, the user terminal transmission data is transferred from the drone management server to the drone, and the drone determines a flight path and a landing position on the basis of the user terminal transmission data and lands.

FIGS. 25 to 27 are sequence diagrams for explaining the above (Processing Example 1) which is an example of a sequence of the target landing position determination processing of the present disclosure.

FIGS. 25 to 27 illustrate the user 50, the user terminal 60, the drone management server 70, and the drone 10 from the left.

As described above with reference to FIGS. 3 to 6, the user 50 holds the user terminal 60 such as a smartphone, and inputs the GPS position information, the address information, the sentence indicating the designated landing position, and the like to the user terminal 60.

The information input to the user terminal 60 is transmitted to the drone management server 70.

The drone management server 70 stores the reception information from the user terminal 60 in the storage unit.

The drone 10 receives the reception information from the user terminal 60 stored in the storage unit by the drone management server 70, analyzes the reception information, analyzes the designated landing position desired by the user 50, and determines the target landing position of the drone 10 on the basis of the analysis result.

The sequence diagrams illustrated in FIGS. 25 to 27 are sequence diagrams for explaining communication processing executed between the apparatuses and a process executed by each apparatus in a case where these processes are performed.

Hereinafter, processing of each step of the sequence diagrams illustrated in FIGS. 25 to 27 will be sequentially described.

(Step S101)

First, in step S101, the user 50 inputs GPS position information or address information as the designated landing position information of the drone desired by the user 50 to the user terminal 60 such as a smartphone.

This process is a process corresponding to the process described above with reference to FIGS. 3 and 4.

In a case where the user 50 is currently at a house having a designated landing position and the user terminal 60 such as a smartphone has a GPS function, it is only required to input latitude and longitude data obtained by the GPS.

As described above with reference to FIG. 3, the latitude and longitude data obtained by the GPS is only required to be input.

On the other hand, in a case where the user terminal 60 such as a smartphone does not have a GPS function or in a case where the current location of the user 50 is different from the designated landing position, as described with reference to FIG. 4, the user 50 is only required to input the address of the house of the user 50.

(Step S102)

Next, in step S102, the user 50 inputs a sentence of the designated landing position information of the drone desired by the user 50 to the user terminal 60 such as a smartphone.

This process is also a process corresponding to the process described above with reference to FIGS. 3 and 4.

The user 50 inputs a sentence describing the landing position of the drone desired by the user 50 in an input field of "(2) sentence indicating designated landing position"

of the user terminal 60 illustrated in FIGS. 3 and 4.

For example, as in the example illustrated in FIGS. 3 and 4, such a sentence as "lawn near door"

is input.

(Step S103)

Next, in step S103, each data of (1) designated landing position (latitude and longitude, or address) and (2) sentence indicating designated landing position input to the user terminal 60 is transmitted to the drone management server 70.

As described above with reference to FIGS. 3 and 4, the user 50 inputs each data of (1) designated landing position (latitude and longitude, or address) and (2) sentence indicating designated landing position, and clicks the transmission button to transmit the input data.

(Step S104)

Next, in step S104, the drone management server 70 receives the transmission data of the user terminal 60, that is, (1) designated landing position (latitude and longitude, or address) and (2) sentence indicating designated landing position, and stores the data in the storage unit.

(Step S105)

Next, in step S105, for example, the drone 10 that performs the processing of delivering the package to the user 50 makes a transfer request to the drone management server 70 for each of the data that the drone management server 70 has received from the user terminal 60 and stored in the storage unit, that is, (1) designated landing position (latitude and longitude, or address) and (2) sentence indicating designated landing position.

(Step S106)

Next, in step S106, the drone management server 70 executes the transmission processing of each of the data stored in the storage unit, that is, (1) designated landing position (latitude and longitude, or address) and (2) sentence indicating designated landing position, to the drone 10.

(Step S107)

Next, in step S107, the drone 10 moves (flies) to the vicinity of the designated landing position (latitude and longitude, or address) according to "(1) designated landing position (latitude and longitude, or address)" received from the drone management server 70.

(Step S108)

Next, in step S108, after arriving at the designated landing position (latitude and longitude, or address), the drone 10 captures an image of the ground.

(Step S109)

Next, in step S109, the drone 10 executes object identification processing based on the captured image, for example, semantic segmentation processing.

As described above with reference to FIGS. 9 and 10, semantic segmentation is a technology of identifying which object category each of constituent pixels (pixels) of an image belongs to, on the basis of, for example, a matching degree between object identification dictionary data (learned data) in which shape information and other feature information of various actual objects are registered and an object in a camera-imaged image.

With this semantic segmentation, it is possible to identify various objects included in the camera-imaged image, for example, types of objects such as a person, a car, a building, a road, a tree, a pond, and lawn.

(Step S110)

Next, in step S110, the drone 10 executes collation processing between the result of the object identification processing (semantic segmentation processing) based on the captured image and the sentence indicating the designated landing position desired by the user 50 received from the drone management server 70, detects an object matching the sentence indicating the designated landing position, and determines the target landing position on the basis of the detection object.

This process is a process corresponding to the process described above with reference to FIGS. 12 to 17.

The drone 10 determines which position in the real space corresponds to the designated position of the sentence indicating the designated landing position desired by the user 50 received from the drone management server 70, for example, sentence indicating designated landing position="lawn near door".

Specifically, as described above with reference to FIGS. 12 to 17, sentence indicating designated landing position="lawn near door"

is separated into morphemes, which are sentence components, and an object corresponding to a noun morpheme is detected from the result of the object identification processing (semantic segmentation processing).

Note that, in a case where the object corresponding to the noun morpheme of the sentence indicating the designated landing position cannot be detected from the result of the object identification processing (semantic segmentation processing), the processing using the similar word dictionary is executed as described above with reference to FIGS. 18 to 24.

That is, the similar word of the word corresponding to the noun morpheme of the sentence indicating the designated landing position is selected, and the object corresponding to the selected similar word is detected from the result of the object identification processing (semantic segmentation processing).

Further, as described with reference to FIGS. 15 to 17 and FIGS. 22 to 24, the target landing position is determined by analyzing the meaning of the morphemes included in the morphological analysis result of sentence indicating designated landing position="lawn near door", and analyzing which position in the real space the designated position of this sentence corresponds to.

(Step S111)

Finally, in step S111, the drone 10 lands at the target landing position determined in step S110.

As described above with reference to FIG. 17, the target landing position 80 determined by the drone 10 on the basis of the sentence indicating the designated landing position transmitted from the user terminal 60 is substantially the same position as the designated landing position 30 set in advance by the user.

By landing toward the target landing position 80, the drone 10 can land at substantially the same position as the designated landing position 30 set in advance by the user.

4-2. (Processing Example 2) Processing Example in which User Terminal Transmission Data Including Designated Landing Position Information (GPS Position or Address) and Sentence Indicating Designated Landing Position is Transmitted from User Terminal to Drone Management Server, Thereafter, Drone Management Server Determines Flight Path and Landing Position of Drone on Basis of User Terminal Transmission Data, Notifies Drone of Determination Information, and Flies and Lands Drone Next, as (Processing Example 2), a processing example will be described in which user terminal transmission data including designated landing position information (GPS position or address) and a sentence indicating the designated landing position is transmitted from the user terminal to the drone management server, and thereafter, the drone management server determines a flight path and a landing position of the drone on the basis of the user terminal transmission data, notifies the drone of the determination information, and flies and lands the drone.

FIGS. 28 to 30 are sequence diagrams for explaining the above (Processing Example 2) which is an example of a sequence of the target landing position determination processing of the present disclosure.

FIGS. 28 to 30 illustrate the user 50, the user terminal 60, the drone management server 70, and the drone 10 from the left.

As described above with reference to FIGS. 3 to 6, the user 50 holds the user terminal 60 such as a smartphone, and inputs the GPS position information, the address information, the sentence indicating the designated landing position, and the like to the user terminal 60.

The information input to the user terminal 60 is transmitted to the drone management server 70.

The drone management server 70 analyzes the reception information from the user terminal 60, analyzes the designated landing position desired by the user 50, and determines the flight path and the landing position of the drone on the basis of the analysis result. Further, notification of the determination information is provided to the drone to fly and land the drone.

The sequence diagrams illustrated in FIGS. 28 to 30 are sequence diagrams for explaining communication processing executed between the apparatuses and a process executed by each apparatus in a case where these processes are performed.

Hereinafter, processing of each step of the sequence diagrams illustrated in FIGS. 28 to 30 will be sequentially described.

(Step S201)

First, in step S201, the user 50 inputs GPS position information or address information as the designated landing position information of the drone desired by the user 50 to the user terminal 60 such as a smartphone.

This process is a process corresponding to the process described above with reference to FIGS. 3 and 4.

In a case where the user 50 is currently at a house having a designated landing position and the user terminal 60 such as a smartphone has a GPS function, it is only required to input latitude and longitude data obtained by the GPS.

As described above with reference to FIG. 3, the latitude and longitude data obtained by the GPS is only required to be input.

On the other hand, in a case where the user terminal 60 such as a smartphone does not have a GPS function or in a case where the current location of the user 50 is different from the designated landing position, as described with reference to FIG. 4, the user 50 is only required to input the address of the house of the user 50.

(Step S202)

Next, in step S202, the user 50 inputs a sentence of the designated landing position information of the drone desired by the user 50 to the user terminal 60 such as a smartphone.

This process is also a process corresponding to the process described above with reference to FIGS. 3 and 4.

The user 50 inputs a sentence describing the landing position of the drone desired by the user 50 in an input field of "(2) sentence indicating designated landing position"

of the user terminal 60 illustrated in FIGS. 3 and 4.

For example, as in the examples illustrated in FIGS. 3 and 4, such a sentence as "lawn near door"

is input.

(Step S203)

Next, in step S203, each data of (1) designated landing position (latitude and longitude, or address) and (2) sentence indicating designated landing position input to the user terminal 60 is transmitted to the drone management server 70.

As described above with reference to FIGS. 3 and 4, the user 50 inputs each data of (1) designated landing position (latitude and longitude, or address) and (2) sentence indicating designated landing position, and clicks the transmission button to transmit the input data.

(Step S204)

Next, in step S204, the drone management server 70 receives the transmission data of the user terminal 60, that is, (1) designated landing position (latitude and longitude, or address) and (2) sentence indicating designated landing position, and stores the data in the storage unit.

(Step S205)

Next, in step S205, for example, the drone 10 that performs the processing of delivering the package to the user 50 makes a transfer request to the drone management server 70 of "(1) designated landing position (latitude and longitude, or address)" among the data that the drone management server 70 has received from the user terminal 60 and stored in the storage unit, that is, (1) designated landing position (latitude and longitude, or address) and (2) sentence indicating designated landing position.

(Step S206)

Next, in step S206, the drone management server 70 transmits "(1) designated landing position (latitude and longitude, or address)" received from the user terminal 60 and stored in the storage unit to the drone 10.

(Step S207)

Next, in step S207, the drone 10 moves (flies) to the vicinity of the designated landing position (latitude and longitude, or address) according to "(1) designated landing position (latitude and longitude, or address)" received from the drone management server 70.

(Step S208)

Next, in step S208, after arriving at the designated landing position (latitude and longitude, or address), the drone 10 captures an image of the ground.

(Step S209)

Next, in step S209, the drone 10 transmits an image of the ground captured at the designated landing position (latitude and longitude, or address) to the drone management server 70.

(Step S210)

Next, in step S210, the drone management server 70 executes object identification processing based on the image of the ground captured at the designated landing position received from the drone 10, for example, semantic segmentation processing.

As described above with reference to FIGS. 9 and 10, semantic segmentation is a technology of identifying which object category each of constituent pixels (pixels) of an image belongs to, on the basis of, for example, a matching degree between object identification dictionary data (learned data) in which shape information and other feature information of various actual objects are registered and an object in a camera-imaged image.

With this semantic segmentation, it is possible to identify various objects included in the camera-imaged image, for example, types of objects such as a person, a car, a building, a road, a tree, a pond, and lawn.

(Step S211)

Next, in step S211, the drone management server 70 executes collation processing between the result of the object identification processing (semantic segmentation processing) based on the captured image and the sentence indicating the designated landing position desired by the user 50 received from the user terminal 60, detects an object matching the sentence indicating the designated landing position, and determines the target landing position on the basis of the detection object.

This process is a process corresponding to the process described above with reference to FIGS. 12 to 17.

The drone management server 70 determines which position in the real space corresponds to the designated position of the sentence indicating the designated landing position desired by the user 50 received from the user terminal 60, for example, sentence indicating designated landing position="lawn near door".

Specifically, as described above with reference to FIGS. 12 to 17, sentence indicating designated landing position="lawn near door"

is separated into morphemes, which are sentence components, and an object corresponding to a noun morpheme is detected from the result of the object identification processing (semantic segmentation processing).

Note that, in a case where the object corresponding to the noun morpheme of the sentence indicating the designated landing position cannot be detected from the result of the object identification processing (semantic segmentation processing), the processing using the similar word dictionary is executed as described above with reference to FIGS. 18 to 24.

That is, the similar word of the word corresponding to the noun morpheme of the sentence indicating the designated landing position is selected, and the object corresponding to the selected similar word is detected from the result of the object identification processing (semantic segmentation processing).

Further, as described with reference to FIGS. 15 to 17 and FIGS. 22 to 24, the target landing position is determined by analyzing the meaning of the morphemes included in the morphological analysis result of sentence indicating designated landing position="lawn near door", and analyzing which position in the real space the designated position of this sentence corresponds to.

(Step S212)

Next, in step S212, the drone management server 70 transmits the target landing position information determined in step S211 to the drone 10.

Various types of processing can be performed as a processing mode in a case where the target landing position information is transmitted to the drone 10. Specifically, for example, processing of generating a composite image in which an identification mark indicating a target landing position is set in a captured image received from the drone 10 and transmitting the composite image to the drone 10 or the like can be applied.

(Step S213)

Finally, in step S2132, the drone 10 lands at the target landing position according to the target landing position information received from the drone management server 70 in step S212.

As described above with reference to FIG. 17, the target landing position 80 determined by the drone 10 on the basis of the sentence indicating the designated landing position transmitted from the user terminal 60 is substantially the same position as the designated landing position 30 set in advance by the user.

By landing toward the target landing position 80, the drone 10 can land at substantially the same position as the designated landing position 30 set in advance by the user.

4-3. (Processing Example 3) Processing Example in which User Terminal Transmission Data Including Designated Landing Position Information (GPS Position or Address) and Sentence Indicating Designated Landing Position is Transferred from User Terminal to Drone, and Drone Determines Flight Path and Landing Position on Basis of User Terminal Transmission Data and Lands Next, as (Processing Example 3), a processing example will be described in which user terminal transmission data including designated landing position information (GPS position or address) and a sentence indicating the designated landing position is transferred from the user terminal to the drone, and the drone determines the flight path and the landing position on the basis of the user terminal transmission data and lands.

FIGS. 31 to 32 are sequence diagrams for explaining the above (Processing Example 3) which is an example of a sequence of the target landing position determination processing of the present disclosure.

In FIGS. 31 to 32, the user 50, the user terminal 60, and the drone 10 are illustrated from the left.

As described above with reference to FIGS. 3 to 6, the user 50 holds the user terminal 60 such as a smartphone, and inputs the GPS position information, the address information, the sentence indicating the designated landing position, and the like to the user terminal 60.

The information input to the user terminal 60 is transmitted to the drone 10.

The drone 10 analyzes the reception information from the user terminal 60, analyzes the designated landing position desired by the user 50, determines the target landing position of the drone 10 on the basis of the analysis result, and lands.

The sequence diagrams illustrated in FIGS. 31 to 32 are sequence diagrams for explaining communication processing executed between the apparatuses and a process executed by each apparatus in a case where these processes are performed.

Hereinafter, processing of each step of the sequence diagrams illustrated in FIGS. 31 to 32 will be sequentially described.

(Step S301)

First, in step S301, the user 50 inputs GPS position information or address information as the designated landing position information of the drone desired by the user 50 to the user terminal 60 such as a smartphone.

This process is a process corresponding to the process described above with reference to FIGS. 3 and 4.

In a case where the user 50 is currently at a house having a designated landing position and the user terminal 60 such as a smartphone has a GPS function, it is only required to input latitude and longitude data obtained by the GPS.

As described above with reference to FIG. 3, the latitude and longitude data obtained by the GPS is only required to be input.

On the other hand, in a case where the user terminal 60 such as a smartphone does not have a GPS function or in a case where the current location of the user 50 is different from the designated landing position, as described with reference to FIG. 4, the user 50 is only required to input the address of the house of the user 50.

(Step S302)

Next, in step S302, the user 50 inputs a sentence of the designated landing position information of the drone desired by the user 50 to the user terminal 60 such as a smartphone.

This process is also a process corresponding to the process described above with reference to FIGS. 3 and 4.

The user 50 inputs a sentence describing the landing position of the drone desired by the user 50
in an input field of "(2) sentence indicating designated landing position"
of the user terminal 60 illustrated in FIGS. 3 and 4.

For example, as in the examples illustrated in FIGS. 3 and 4, such a sentence as
"lawn near door"
is input.

(Step S303)

Next, in step S303, each data of
(1) designated landing position (latitude and longitude, or address) and
(2) sentence indicating designated landing position
input to the user terminal 60 is transmitted to the drone 10 that performs processing of delivering package to the user 50.

As described above with reference to FIGS. 3 and 4, the user 50 inputs each data of
(1) designated landing position (latitude and longitude, or address) and
(2) sentence indicating designated landing position,
and clicks the transmission button to transmit the input data.

(Step S304)

Next, in step S304, the drone 10 receives the transmission data of the user terminal 60, that is,
(1) designated landing position (latitude and longitude, or address) and
(2) sentence indicating designated landing position, and stores the data in the storage unit.

(Step S305)

Next, in step S305, the drone 10 moves (flies) to the vicinity of the designated landing position (latitude and longitude, or address) according to "(1) designated landing position (latitude and longitude, or address)" received from the user terminal 60.

(Step S306)

Next, in step S306, after arriving at the designated landing position (latitude and longitude, or address), the drone 10 captures an image of the ground.

(Step S307)

Next, in step S307, the drone 10 executes object identification processing based on the captured image, for example, semantic segmentation processing.

As described above with reference to FIGS. 9 and 10, semantic segmentation is a technology of identifying which object category each of constituent pixels (pixels) of an image belongs to, on the basis of, for example, a matching degree between object identification dictionary data (learned data) in which shape information and other feature information of various actual objects are registered and an object in a camera-imaged image.

With this semantic segmentation, it is possible to identify various objects included in the camera-imaged image, for example, types of objects such as a person, a car, a building, a road, a tree, a pond, and lawn.

(Step S308)

Next, in step S308, the drone 10 executes collation processing between the result of the object identification processing (semantic segmentation processing) based on the captured image and the sentence indicating the designated landing position desired by the user 50 received from the user terminal 60, detects an object matching the sentence indicating the designated landing position, and determines the target landing position on the basis of the detection object.

This process is a process corresponding to the process described above with reference to FIGS. 12 to 17.

The drone 10 determines which position in the real space corresponds to the designated position of the sentence indicating the designated landing position desired by the user 50 received from the user terminal 60, for example, sentence indicating designated landing position="lawn near door".

Specifically, as described above with reference to FIGS. 12 to 17, sentence indicating designated landing position="lawn near door"

is separated into morphemes, which are sentence components, and an object corresponding to a noun morpheme is detected from the result of the object identification processing (semantic segmentation processing).

Note that, in a case where the object corresponding to the noun morpheme of the sentence indicating the designated landing position cannot be detected from the result of the object identification processing (semantic segmentation processing), the processing using the similar word dictionary is executed as described above with reference to FIGS. 18 to 24.

That is, the similar word of the word corresponding to the noun morpheme of the sentence indicating the designated landing position is selected, and the object corresponding to the selected similar word is detected from the result of object identification processing (semantic segmentation processing).

Further, as described with reference to FIGS. 15 to 17 and FIGS. 22 to 24, the target landing position is determined by analyzing the meaning of the morphemes included in the morphological analysis result of sentence indicating designated landing position="lawn near door", and analyzing which position in the real space the designated position of this sentence corresponds to.

(Step S309)

Finally, in step S309, the drone 10 lands at the target landing position determined in step S308.

As described above with reference to FIG. 17, the target landing position 80 determined by the drone 10 on the basis of the sentence indicating the designated landing position transmitted from the user terminal 60 is substantially the same position as the designated landing position 30 set in advance by the user.

By landing toward the target landing position 80, the drone 10 can land at substantially the same position as the designated landing position 30 set in advance by the user.

Note that, in the above-described embodiment, an example has been described in which a drone is used as a mobile body that arrives at a target position that is a designated position of a user. However, the processing of the present disclosure, that is, the mobile body that arrives at the target position that is the designated position of the user is not limited to a drone, and can be applied to various mobile bodies other than a drone, such as an automated traveling robot and an automated driving vehicle.

That is, the user also generates a sentence indicating the designated arrival position for various mobile bodies other than the drone, such as an automated traveling robot and an automated driving vehicle, and transmits the sentence to the drone 10 or the drone management server 70 which is the information processing apparatus of the present disclosure, similarly to the above embodiment.

The drone 10 and the drone management server 70 perform processing of performing analysis such as morphological analysis or the like of the sentence indicating the designated arrival position, collating the constituent words of the sentence indicating the designated arrival position with the object identification result based on the captured image of the camera mounted on the mobile body, and analyzing the designated target arrival position of the user.

As described above, the processing of the present disclosure is effective processing for causing the drone or various mobile bodies other than the drone to reach the arrival position designated by the user.

5. Configuration Example of Apparatus Used in Processing of Present Disclosure Next, a configuration example of an apparatus used for processing of the present disclosure will be described.

Apparatuses used for the processing of the present disclosure include the drone 10, the user terminal 60, and the drone management server 70.

Hereinafter, configuration examples of these apparatuses will be described.

Figure 33:
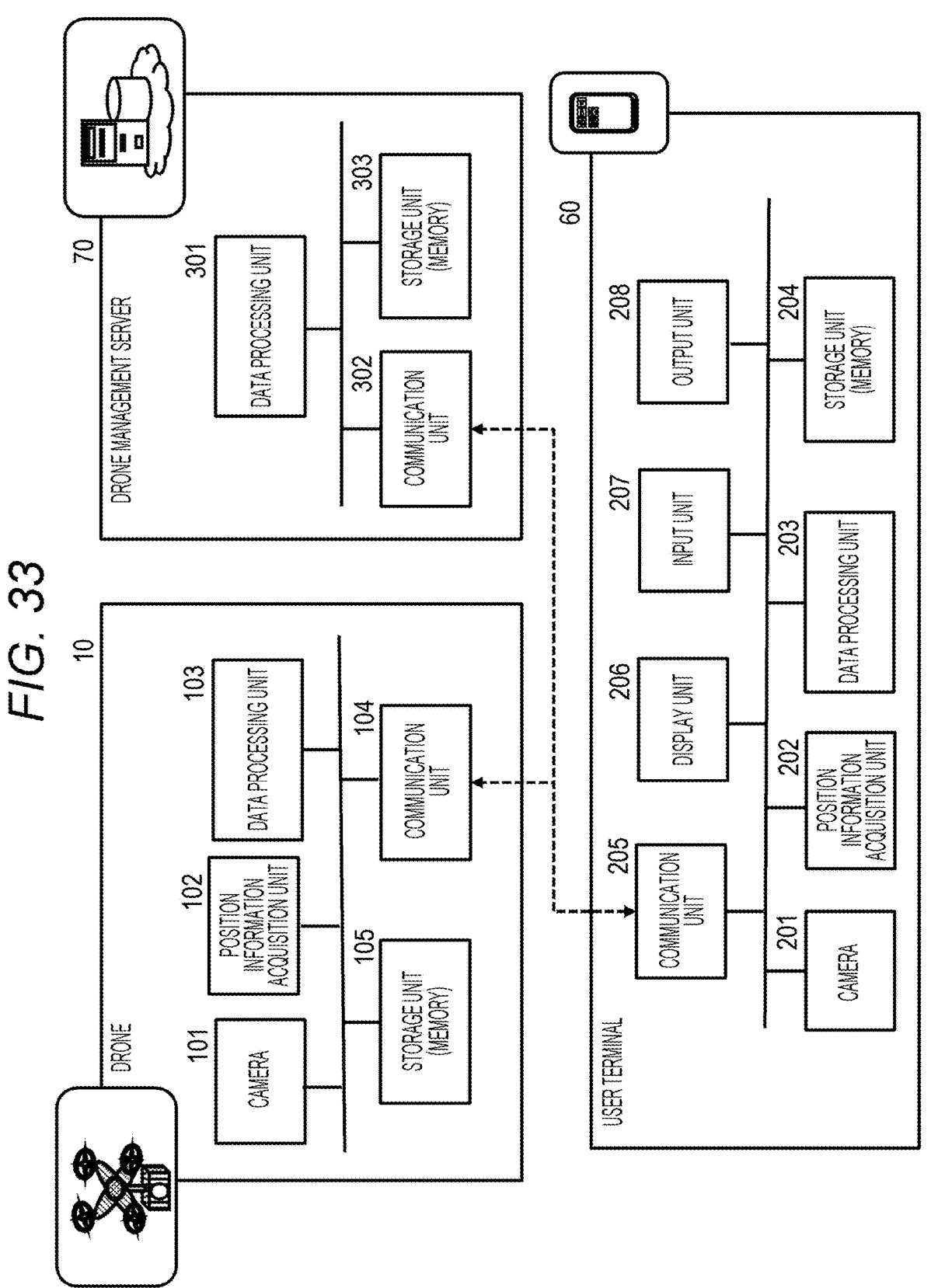
FIG. 33 is a diagram for explaining a configuration example of each apparatus used in the present disclosure.

FIG. 33 is a diagram illustrating a configuration example of the drone 10, the user terminal 60, and the drone management server 70.

As described above, the information processing apparatus of the present disclosure, that is, the information processing apparatus that determines the target arrival position such as the target landing position of the mobile body can be configured in the drone 10 and the drone management server 70.

Note that the information processing apparatus other than the drone 10 and the drone management server 70 can also perform processing of determining the target arrival position such as the target landing position of the mobile body according to the above-described sequences.

The user terminal 60 includes, for example, a communication terminal such as a smartphone, an apparatus such as a PC, or the like.

The drone 10 is not limited to a drone, and may be a robot, an automated driving vehicle, or the like.

The drone management server 70 may be a robot management server, an automated driving vehicle management server, or the like.

The drone 10, the user terminal 60, and the drone management server 70 illustrated in FIG. 33 have a communicable configuration. Furthermore, the drone 10 and the user terminal 60 can acquire position information using communication information from a GPS satellite.

As illustrated in the drawing, the drone 10 includes a camera 101, a position information acquisition unit 102, a data processing unit 103, a communication unit 104, and a storage unit (memory) 105.

The camera 101 is used, for example, for capturing processing of an image of the ground viewed from the drone, and capturing of an image applied to simultaneous localization and mapping processing (for example, SLAM processing).

The position information acquisition unit 102 executes communication with, for example, a GPS satellite, analyzes the current position (latitude, longitude, height) of the drone 10 on the basis of communication information with the GPS satellite, and outputs the analysis information to the data processing unit 103.

The data processing unit 103 controls processing executed in the autonomous mobile body 100, such as simultaneous localization and mapping (SLAM) processing and image capture control.

Specifically, various processes described in the above-described embodiments are executed.

For example, the following processes are executed.

(a) Flight control for flying in accordance with designated landing position information (latitude, longitude, or address) received from user terminal 60

(b) Analysis of sentence indicating designated landing position received from user terminal 60

(c) Object analysis processing (semantic segmentation) using captured image of camera 101

(d) Determination of target landing position by collation processing between sentence indicating designated landing position received from user terminal 60 and result of object analysis processing (semantic segmentation)

(e) Landing control to determined target landing position

For example, various processes including these processes are executed.

The data processing unit 103 includes, for example, a processor such as a CPU having a program execution function, and executes processing according to a program stored in the storage unit 105.

The communication unit 104 executes communication with the user terminal 60 and the drone management server 70.

The storage unit (memory) 105 is used as a storage area and a work area of a program executed by the data processing unit 103. It is also used as a storage area for various parameters applied to processing. The storage unit (memory) 105 includes a RAM, a ROM, and the like.

Next, a configuration of the user terminal 60 will be described. As illustrated in the drawing, the user terminal 60 includes a camera 201, a position information acquisition unit 202, a data processing unit 203, a storage unit (memory) 204, a communication unit 205, a display unit 206, an input unit 207, and an output unit 208.

The position information acquisition unit 202 executes communication with, for example, a GPS satellite, analyzes a current position (latitude, longitude) of the user terminal 60 on the basis of communication information from the GPS satellite, and outputs the analysis information to the data processing unit 203.

The data processing unit 203 executes various processes described in the above-described embodiments.

For example, (a) Acquisition processing, display processing, and transmission processing of latitude and longitude information as designated landing position information (b) Display processing and transmission processing of address information indicating designated landing position which is user input information (c) Display processing and transmission processing of sentence indicating designated landing position which is user input information The data processing unit 203 includes, for example, a processor such as a CPU having a program execution function, and executes processing according to a program stored in the storage unit 204.

The storage unit (memory) 204 is used as a storage area and a work area of a program executed by the data processing unit 203. It is also used as a storage area for various parameters applied to processing. The storage unit (memory) 204 includes a RAM, a ROM, and the like.

The communication unit 205 executes communication with the drone 10 and the drone management server 70 which is an external server. For example, the communication unit 205 executes the processing of transmitting the user input information of (1) designated landing position (latitude and longitude, or address) and (2) sentence indicating designated landing position to the drone 10 or the drone management server 70.

The display unit 206 executes the display processing of the camera-imaged image, as well as user input data, that is, (1) designated landing position (latitude and longitude, or address) and (2) sentence indicating designated landing position.

The input unit 207 is an operation unit by the user and is used for various processes, for example, input processing of information on (1) designated landing position (latitude and longitude, or address) and (2) sentence indicating designated landing position, and input processing of user requests such as data transmission.

The output unit 208 includes a sound output unit, an image output unit, and the like.

Next, a configuration of the drone management server 70 will be described. As illustrated in the drawing, the drone management server 70 includes a data processing unit 301, a communication unit 302, and a storage unit (memory) 303.

The data processing unit 301 executes various processes described in the above-described embodiments.

Specifically, various processes described in the above-described embodiments are executed.

For example, the following processes are executed.

(a) Generation of flight control information for flying in accordance with designated landing position information (latitude, longitude, or address) received from user terminal 60

(b) Analysis of sentence indicating designated landing position received from user terminal 60

(c) Object analysis processing (semantic segmentation) using captured image of camera 101 of drone 100

(d) Determination of target landing position by collation processing between sentence indicating designated landing position received from user terminal 60 and result of object analysis processing (semantic segmentation)

(e) Generation processing of landing control information to determined target landing position For example, various processes including these processes are executed.

The data processing unit 301 includes, for example, a processor such as a CPU having a program execution function, and executes processing according to a program stored in the storage unit 303.

The communication unit 302 executes communication with the drone 10 and the user terminal 60.

The storage unit (memory) 303 is used as a storage area and a work area of a program executed by the data processing unit 301. It is also used as a storage area for various parameters applied to processing. The storage unit (memory) 303 includes a RAM, a ROM, and the like.

Note that, as described above, in the above-described embodiments, examples in which the mobile body is a drone have been described. However, the processing of the present disclosure is not limited to a drone, and can be applied to other mobile bodies, for example, a robot and an automated traveling vehicle.

Similar processing can be performed by replacing the drone in the above-described embodiments with a robot or automated traveling vehicle.

6. Summary of Configurations of Present Disclosure

The embodiments of the present disclosure have been described above in detail with reference to the specific embodiments. However, it is self-evident that a person skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present specification can have the following configurations.

(1) An information processing method executed in an information processing apparatus, the information processing method including a data processing unit executing:

object identification processing of analyzing a captured image of a camera mounted on a mobile body and identifying an object type of a subject included in the captured image;

sentence analysis processing of analyzing a sentence indicating a designated arrival position of the mobile body;

word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body.

(2) The information processing method according to (1), in which the mobile body is a drone, the target arrival position of the mobile body is a target landing position of the drone, and the data processing unit determines the target landing position of the drone in the target arrival position determination processing.

(3) The information processing method according to (1) or (2), in which the sentence indicating the designated arrival position is a sentence transmitted from an external terminal, and the data processing unit executes analysis processing of the sentence indicating the designated arrival position transmitted from the external terminal in the sentence analysis processing.

(4) The information processing method according to any one of (1) to (3), in which the sentence indicating the designated arrival position is a sentence transmitted from a user terminal when a user who requests movement of the mobile body inputs the sentence to the user terminal, and the data processing unit executes analysis processing of the sentence indicating the designated arrival position transmitted from the user terminal in the sentence analysis processing.

(5) The information processing method according to any one of (1) to (4), in which the data processing unit executes morphological analysis of the sentence indicating the designated arrival position in the sentence analysis processing, and selects the subject corresponding to the word extracted by the morphological analysis from the captured image in the word-corresponding subject selection processing.

(6) The information processing method according to (5), in which the data processing unit selects a subject corresponding to a noun in words analyzed by the morphological analysis from the captured image.

(7) The information processing method according to any one of (1) to (6), in which the data processing unit determines a movement route of the mobile body and the target arrival position by inputting each data of (a) latitude and longitude information or address information of the designated arrival position, and (b) the sentence indicating the designated arrival position, transmitted from the user terminal.

(8) The information processing method according to any one of (1) to (7), in which the data processing unit executes semantic segmentation in the object identification processing.

(9) The information processing method according to any one of (1) to (8), in which in the word-corresponding subject selection processing, in a case where the subject corresponding to the word included in the sentence indicating the designated arrival position cannot be selected from the captured image, the data processing unit executes processing of searching for a similar word similar to the word included in the sentence indicating the designated arrival position, and selecting a subject corresponding to the similar word from the captured image.

(10) The information processing method according to any one of (1) to (9), in which the information processing apparatus is configured inside the mobile body, and the data processing unit receives the sentence to be analyzed in the sentence analysis processing from a user terminal or an external server.

(11) The information processing method according to any one of (1) to (10), in which the information processing apparatus is configured inside the mobile body, and the data processing unit executes movement control of moving the mobile apparatus toward the target arrival position determined in the target arrival position determination processing.

(12) The information processing method according to any one of (1) to (11),
in which the information processing apparatus is configured inside a server capable of communicating with the mobile body, and
the data processing unit
receives the sentence to be analyzed in the sentence analysis processing from a user terminal.
(13) The information processing method according to any one of (1) to (12),
in which the information processing apparatus is configured inside a server capable of communicating with the mobile body, and
the data processing unit
executes processing of transmitting the target arrival position determined in the target arrival position determination processing to the mobile apparatus.
(14) An information processing apparatus including a data processing unit that determines a target arrival position of a mobile body,
the data processing unit executing:
object identification processing of analyzing a captured image of a camera mounted on the mobile body and identifying an object type of a subject included in the captured image;
sentence analysis processing of analyzing a sentence indicating a designated arrival position of the mobile body;
word-corresponding subject selection processing of collating a result of the sentence analysis processing with a result of the object identification processing and selecting a subject corresponding to a word included in the sentence indicating the designated arrival position from the captured image; and
target arrival position determination processing of extracting an area corresponding to the designated arrival position indicated by the sentence indicating the designated arrival position from the captured image on the basis of a result of the word-corresponding subject selection processing, and determining the area extracted as the target arrival position of the mobile body.
(15) An information processing system including a mobile body, a user terminal, and a drone management server,
in which the user terminal transmits a sentence indicating a designated arrival position of the mobile body to the drone management server,
the drone management server transfers the sentence indicating the designated arrival position received from the user terminal to the mobile body, and
the mobile body executes:
object identification processing of analyzing a captured image of a camera mounted on the mobile body and identifying an object type of a subject included in the captured image;
sentence analysis processing of analyzing the sentence indicating the designated arrival position received from the drone management server;
word-corresponding subject selection processing of collating a result of the sentence analysis processing with a result of the object identification processing and selecting a subject corresponding to a word included in the sentence indicating the designated arrival position from the captured image; and
target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body.
(16) An information processing system including a mobile body, a user terminal, and a drone management server,
in which the user terminal transmits a sentence indicating a designated arrival position of the mobile body to the drone management server,
the mobile body transmits a captured image of a camera mounted on the mobile body to the drone management server, and
the drone management server executes:
object identification processing of analyzing the captured image received from the mobile body and identifying an object type of a subject included in the captured image;
sentence analysis processing of analyzing the sentence indicating the designated arrival position received from the user terminal;
word-corresponding subject selection processing of collating a result of the sentence analysis processing with a result of the object identification processing and selecting a subject corresponding to a word included in the sentence indicating the designated arrival position from the captured image; and
target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body, and
transmits the determined target arrival position to the drone.
(17) An information processing system including a mobile body and a user terminal,
in which a user terminal transmits a sentence indicating a designated arrival position of the mobile body to the mobile body, and
the mobile body executes:
object identification processing of analyzing a captured image of a camera mounted on the mobile body and determining an object type of a subject included in the captured image;
sentence analysis processing of analyzing a sentence indicating the designated arrival position received from the user terminal;
word-corresponding subject selection processing of collating a result of the sentence analysis processing with a result of the object identification processing and selecting a subject corresponding to a word included in a sentence indicating the designated arrival position from the captured image; and
target arrival position determination processing of extracting an area corresponding to a designated arrival position indicated by a sentence indicating the designated arrival position from the captured image on the basis of a result of the word-corresponding subject selection processing, and determining the extraction area as a target arrival position of the mobile body.

(18) A program for executing information processing executed in an information processing apparatus, the program causing a data processing unit to execute:

object identification processing of analyzing a captured image of a camera mounted on a mobile body and identifying an object type of a subject included in the captured image;

sentence analysis processing of analyzing a sentence indicating a designated arrival position of the mobile body;

word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body.

Furthermore, a series of processing described in the specification can be performed by hardware, software, or a configuration obtained by combining hardware and software. In a case where processing by software is performed, a program in which a processing sequence is recorded can be installed and performed in a memory in a computer incorporated in dedicated hardware, or the program can be installed and performed in a general-purpose computer capable of performing various types of processing. For example, the program can be recorded in advance in a recording medium. In addition to being installed on a computer from a recording medium, the program can be received via a network such as a local area network (LAN) or the Internet and installed on a recording medium such as an internal hard disk or the like.

Note that the various types of processing described in the specification may be performed not only in a chronological order in accordance with the description, but may also be performed in parallel or individually depending on processing capability of an apparatus that performs the processing or depending on the necessity. Furthermore, in the present specification, a system is a logical set configuration of a plurality of apparatuses, and is not limited to a system in which apparatuses of configurations are in the same housing.

INDUSTRIAL APPLICABILITY

As described above, according to the configuration of an embodiment of the present disclosure, a configuration that enables determination of the target landing position of the drone according to the sentence indicating the landing position generated by the user is realized.

Specifically, for example, object identification processing of analyzing a captured image of a camera mounted on a mobile body and identifying an object type of a subject included in the captured image; sentence analysis processing of analyzing a sentence indicating a designated arrival position of the mobile body; word-corresponding subject selection processing of collating a result of the sentence analysis processing with a result of the object identification processing and selecting a subject corresponding to a word included in the sentence indicating the designated arrival position from the captured image; and target arrival position determination processing of extracting an area corresponding to the designated arrival position indicated by the sentence indicating the designated arrival position from the captured image on the basis of a result of the word-corresponding subject selection processing, and determining the area extracted as a target arrival position of the mobile body are executed.

With this configuration, a configuration is realized in which the target landing position of the drone can be determined according to the sentence indicating the landing position generated by the user.

REFERENCE SIGNS LIST

10 Drone
30 Designated landing position
40 GPS satellite
50 User
60 User terminal
70 Drone management server
101 Camera
102 Position information acquisition unit
103 Data processing unit
104 Communication unit
105 Storage unit (memory)
201 Camera
202 Position information acquisition unit
203 Data processing unit
204 Storage unit (memory)
205 Communication unit
206 Display unit
207 Input unit
208 Output unit
301 Data processing unit
302 Communication unit
303 Storage unit (memory)

The invention claimed is:

1. An information processing method executed in an information processing apparatus, the information processing method, comprising:

object identification processing of analyzing a captured image captured by a camera mounted on a mobile body and identifying an object type of a subject included in the captured image;

sentence analysis processing of analyzing a sentence indicating a designated arrival position of the mobile body;

word-corresponding subject selection processing of collating a result of the sentence analysis processing with a result of the object identification processing and selecting a subject corresponding to a word included in the sentence indicating the designated arrival position from the captured image;

target arrival position determination processing of extracting an area corresponding to the designated arrival position indicated by the sentence indicating the designated arrival position from the captured image on a basis of a result of the word-corresponding subject selection processing, and determining the area extracted as a target arrival position of the mobile body; and autonomously navigating to and landing at the target arrival position.

2. The information processing method according to claim 1, wherein the mobile body is a drone, wherein the target arrival position of the mobile body is a target landing position of the drone, and the method further comprising:

determining the target landing position of the drone in the target arrival position determination processing.

3. The information processing method according to claim 1, wherein the sentence indicating the designated arrival position is a sentence transmitted from an external terminal, and the method further comprising:

executing analysis processing of the sentence indicating the designated arrival position transmitted from the external terminal in the sentence analysis processing.

4. The information processing method according to claim 1, wherein the sentence indicating the designated arrival position is a sentence transmitted from a user terminal when a user who requests movement of the mobile body inputs the sentence to the user terminal, and the method further comprising:

executing analysis processing of the sentence indicating the designated arrival position transmitted from the user terminal in the sentence analysis processing.

5. The information processing method according to claim 1, further comprising:

executing morphological analysis of the sentence indicating the designated arrival position in the sentence analysis processing, and selecting the subject corresponding to the word extracted by the morphological analysis from the captured image in the word-corresponding subject selection processing.

6. The information processing method according to claim 5, further comprising:

selecting a subject corresponding to a noun in words analyzed by the morphological analysis from the captured image.

7. The information processing method according to claim 1, further comprising:

determining a movement route of the mobile body and the target arrival position by inputting each data of (a) latitude and longitude information or address information of the designated arrival position, and (b) the sentence indicating the designated arrival position, transmitted from the user terminal.

8. The information processing method according to claim 1, further comprising:

executing semantic segmentation in the object identification processing.

9. The information processing method according to claim 1, wherein in the word-corresponding subject selection processing includes in a case where the subject corresponding to the word included in the sentence indicating the designated arrival position cannot be selected from the captured image, executing processing of searching for a similar word similar to the word included in the sentence indicating the designated arrival position, and selecting a subject corresponding to the similar word from the captured image.

10. The information processing method according to claim 1, wherein the information processing apparatus is configured inside the mobile body, and the method further comprising:

receiving the sentence to be analyzed in the sentence analysis processing from a user terminal or an external server.

11. The information processing method according to claim 1, wherein the information processing apparatus is configured inside the mobile body, and the method further comprising executing movement control of moving the mobile body toward the target arrival position determined in the target arrival position determination processing.

12. The information processing method according to claim 1, wherein the information processing apparatus is configured inside a server capable of communicating with the mobile body, and the method further comprising receiving the sentence to be analyzed in the sentence analysis processing from a user terminal.

13. The information processing method according to claim 1, wherein the information processing apparatus is configured inside a server capable of communicating with the mobile body, and the method further comprising:

executing processing of transmitting the target arrival position determined in the target arrival position determination processing to the mobile body.

14. An information processing apparatus, comprising:

processing circuitry configured to analyze a captured image captured by a camera mounted on a mobile body and identify an object type of a subject included in the captured image;

analyze a sentence indicating a designated arrival position of the mobile body;

collate a result of the sentence analysis with a result of the captured image analysis and select a subject corresponding to a word included in the sentence indicating the designated arrival position from the captured image;

extract an area corresponding to the designated arrival position indicated by the sentence indicating the designated arrival position from the captured image based on a result of the collation, and determine the area extracted as a target arrival position of the mobile body; and autonomously navigate to and land at the target arrival position.

15. An information processing system, comprising:

a mobile body, a user terminal, and a mobile body management server, wherein the user terminal transmits a sentence indicating a designated arrival position of the mobile body to the mobile body management server, the mobile body management server transfers the sentence indicating the designated arrival position received from the user terminal to the mobile body, and the mobile body including processing circuitry configured to analyze a captured image captured by a camera mounted on the mobile body and identifying an object type of a subject included in the captured image;

analyze the sentence indicating the designated arrival position received from the mobile body management server;

collate a result of the sentence analysis with a result of the captured image analysis and select a subject corresponding to a word included in the sentence indicating the designated arrival position from the captured image;

extract an area corresponding to the designated arrival position indicated by the sentence indicating the designated arrival position from the captured image based on a result of the collation, and determine the area extracted as a target arrival position of the mobile body; and autonomously navigate to and land at the target arrival position.

16. An information processing system, comprising:
a mobile body,
a user terminal, and
a drone management server,
wherein the user terminal transmits a sentence indicating a designated arrival position of the mobile body to the drone management server, the mobile body transmits a captured image captured by a camera mounted on the mobile body to the drone management server, and the drone management server includes processing circuitry configured to analyze the captured image received from the mobile body and identify an object type of a subject included in the captured image;

analyze the sentence indicating the designated arrival position received from the user terminal;

collate a result of the sentence analysis with a result of the captured image analysis and select a subject corresponding to a word included in the sentence indicating the designated arrival position from the captured image;

extract an area corresponding to the designated arrival position indicated by the sentence indicating the designated arrival position from the captured image based on a result of the collation, and determine the area extracted as a target arrival position of the mobile body; and transmit the determined target arrival position to the mobile body; and the mobile body autonomously navigates to and lands at the target arrival position.

17. An information processing system, comprising:
a mobile body, and
a user terminal,
wherein a user terminal transmits a sentence indicating a designated arrival position of the mobile body to the mobile body, and the mobile body includes processing circuitry configured to analyze a captured image captured by a camera mounted on a mobile body and identify an object type of a subject included in the captured image;

analyze a sentence indicating a designated arrival position of the mobile body;

collate a result of the sentence analysis with a result of the captured image analysis and select a subject corresponding to a word included in the sentence indicating the designated arrival position from the captured image;

extract an area corresponding to the designated arrival position indicated by the sentence indicating the designated arrival position from the captured image based on a result of the collation, and determine the area extracted as a target arrival position of the mobile body; and autonomously navigate to and land at the target arrival position.

18. A non-transitory computer-readable storage medium storing computer-readable instructions thereon which, when executed by an information processing apparatus, causes the information processing apparatus to perform a method, the method comprising:

object identification processing of analyzing a captured image captured by a camera mounted on a mobile body and identifying an object type of a subject included in the captured image;

sentence analysis processing of analyzing a sentence indicating a designated arrival position of the mobile body;

word-corresponding subject selection processing of collating a result of the sentence analysis processing with a result of the object identification processing and selecting a subject corresponding to a word included in the sentence indicating the designated arrival position from the captured image;

target arrival position determination processing of extracting an area corresponding to the designated arrival position indicated by the sentence indicating the designated arrival position from the captured image on a basis of a result of the word-corresponding subject selection processing, and determining the area extracted as a target arrival position of the mobile body; and autonomously navigating to and landing at the target arrival position.

\* \* \* \* \*